ROBERT L. KENT ROSARIO S. BADESSA
CARL BARUS  JOSEPH M. DUNN
RAYMOND A. GLASER  LEONARD B. JOHNSON
*INVENTORS*

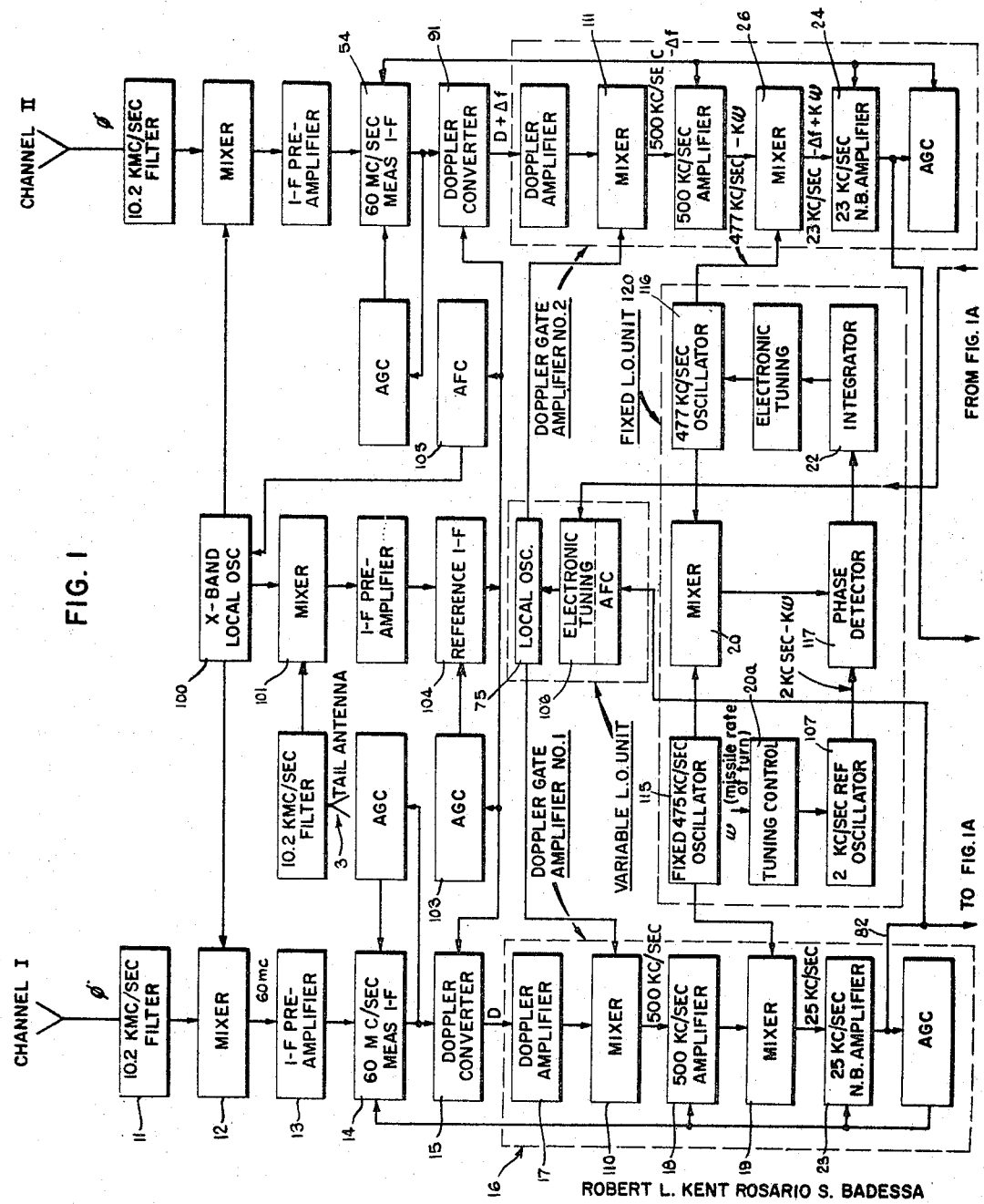

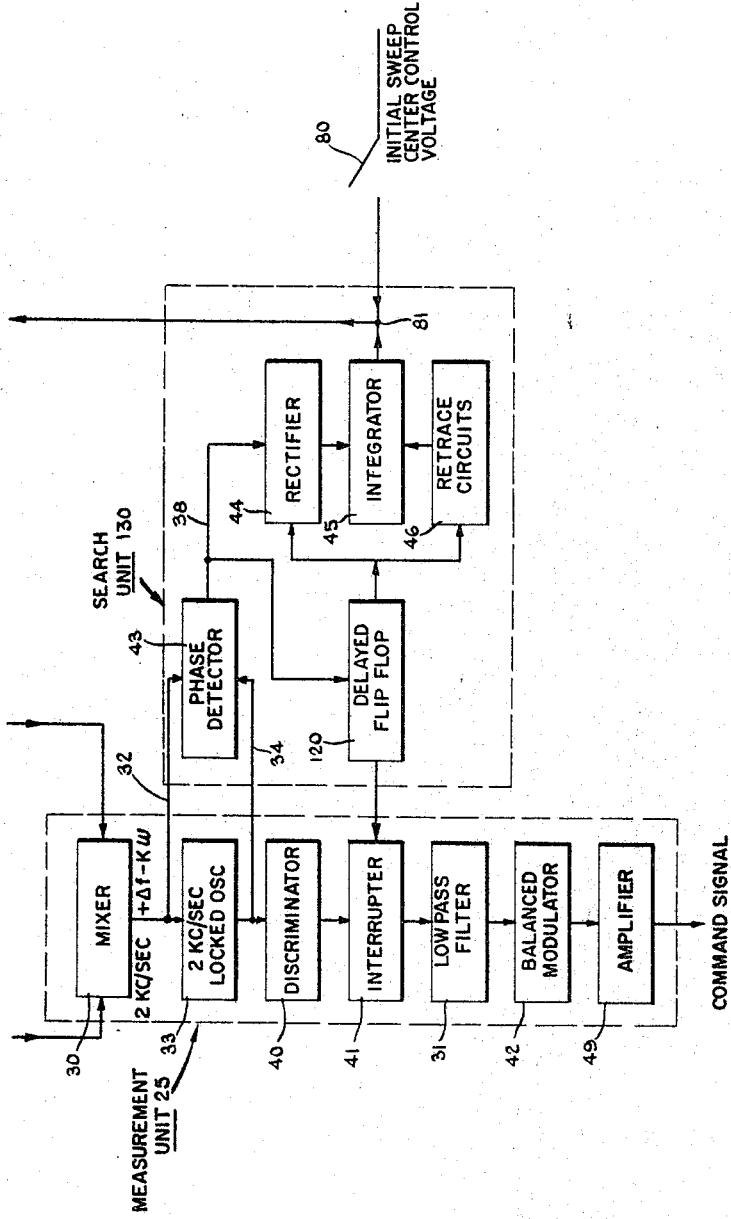

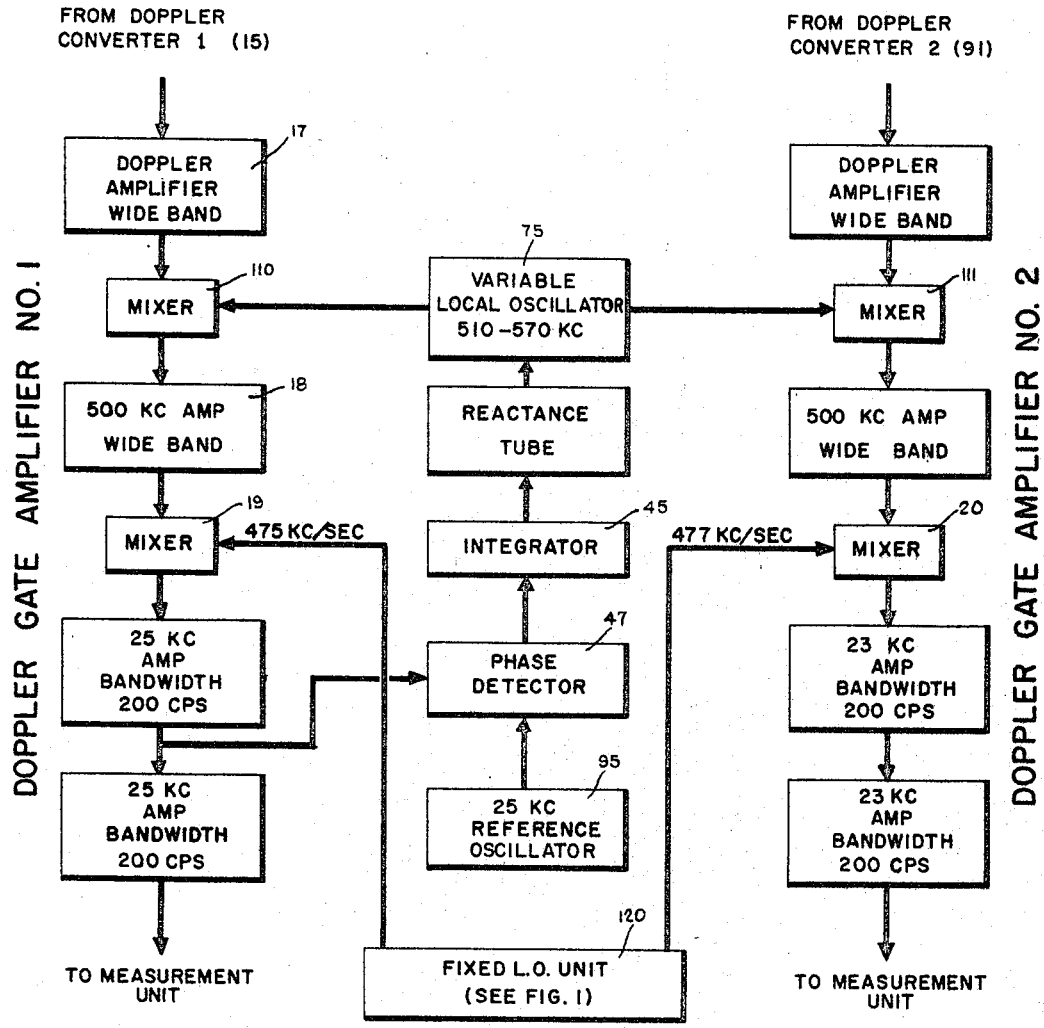

BY
*ATTORNEYS*

ROBERT L. KENT ROSARIO S. BADESSA
CARL BARUS    JOSEPH M. DUNN
RAYMOND A. GLASER LEONARD B. JOHNSON
*INVENTORS*

BY

ATTORNEYS

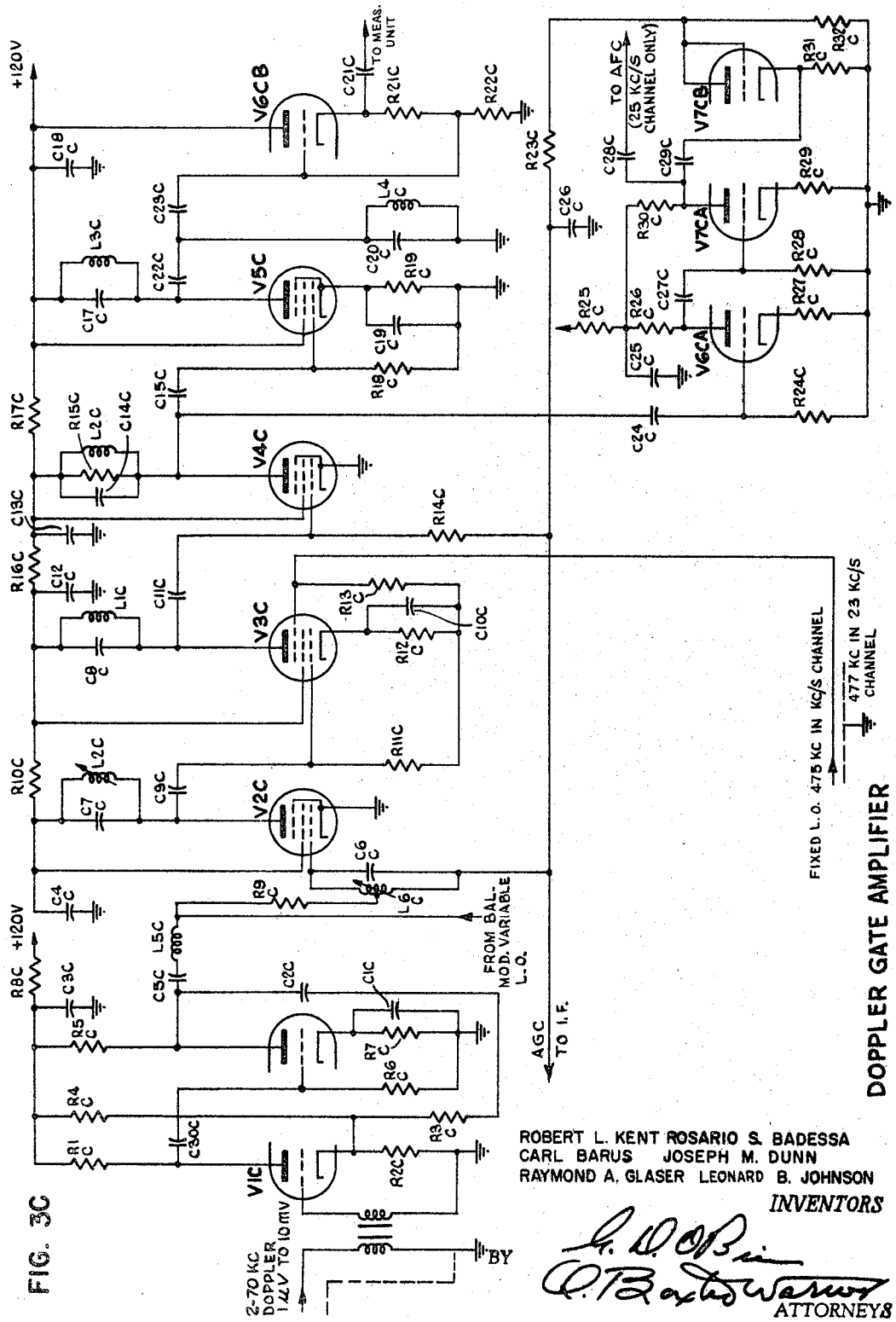

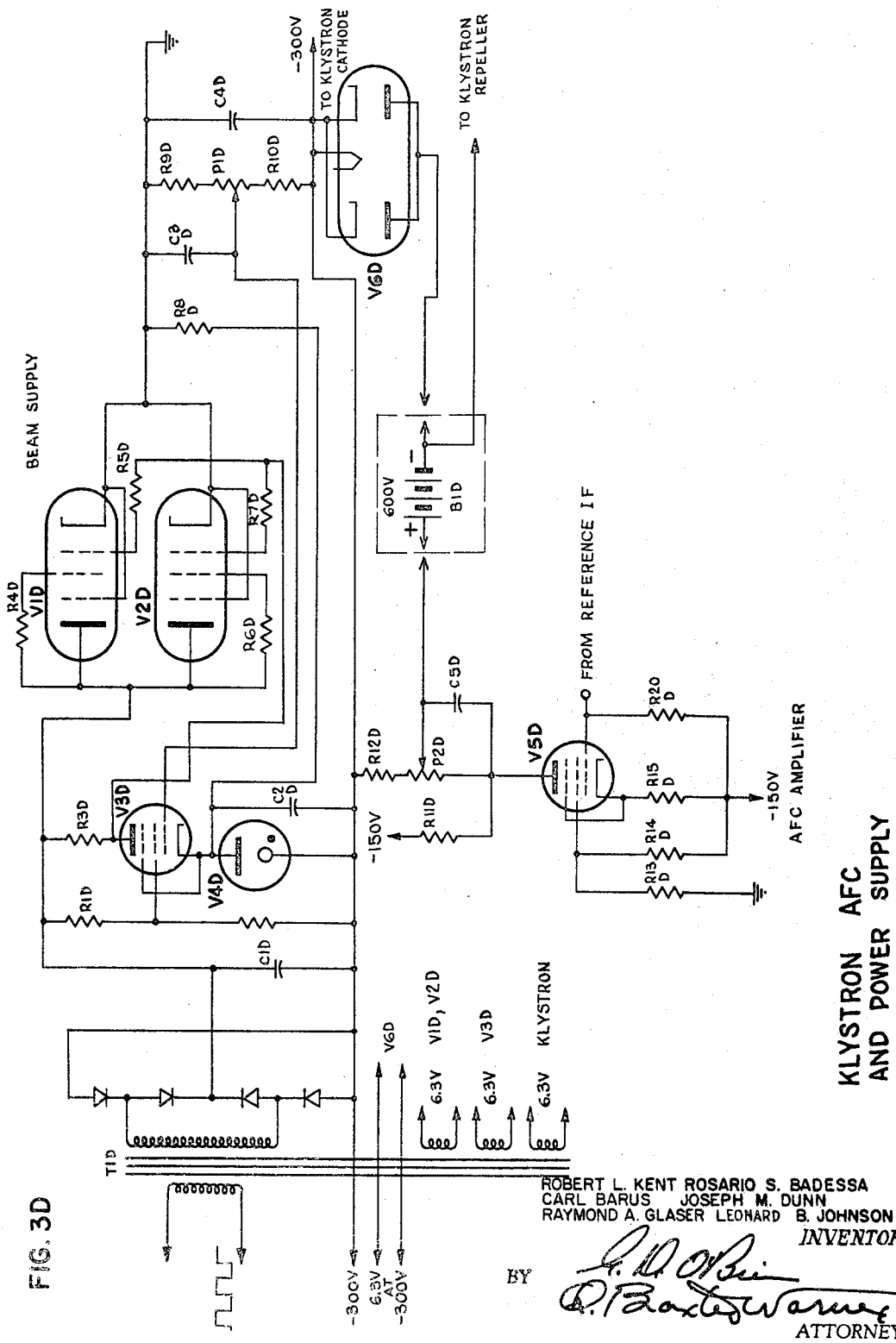

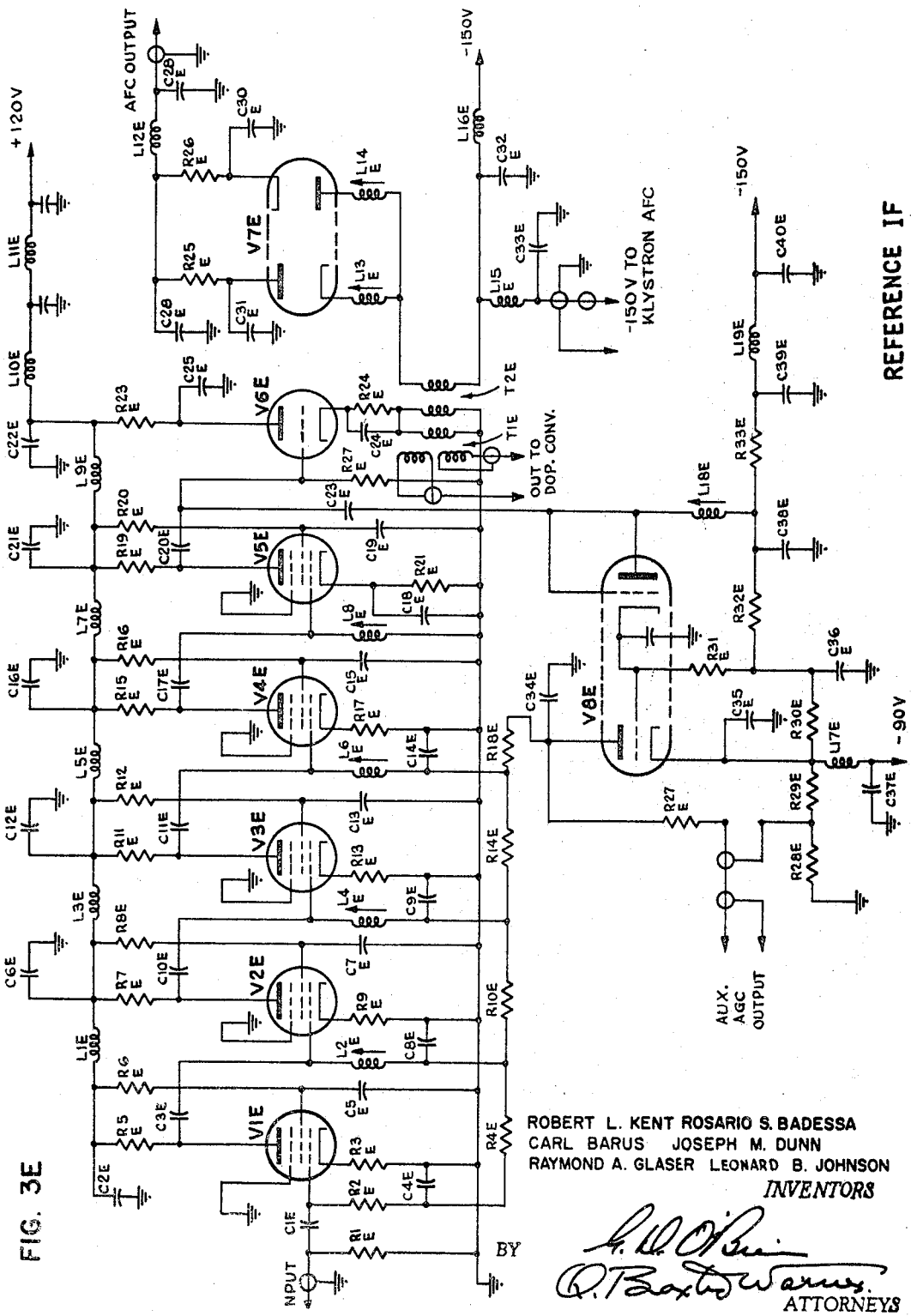

Nov. 11, 1969
R. L. KENT ET AL
3,477,666
GUIDANCE SYSTEM
Filed May 14, 1958
13 Sheets-Sheet 9
FIG. 3F1
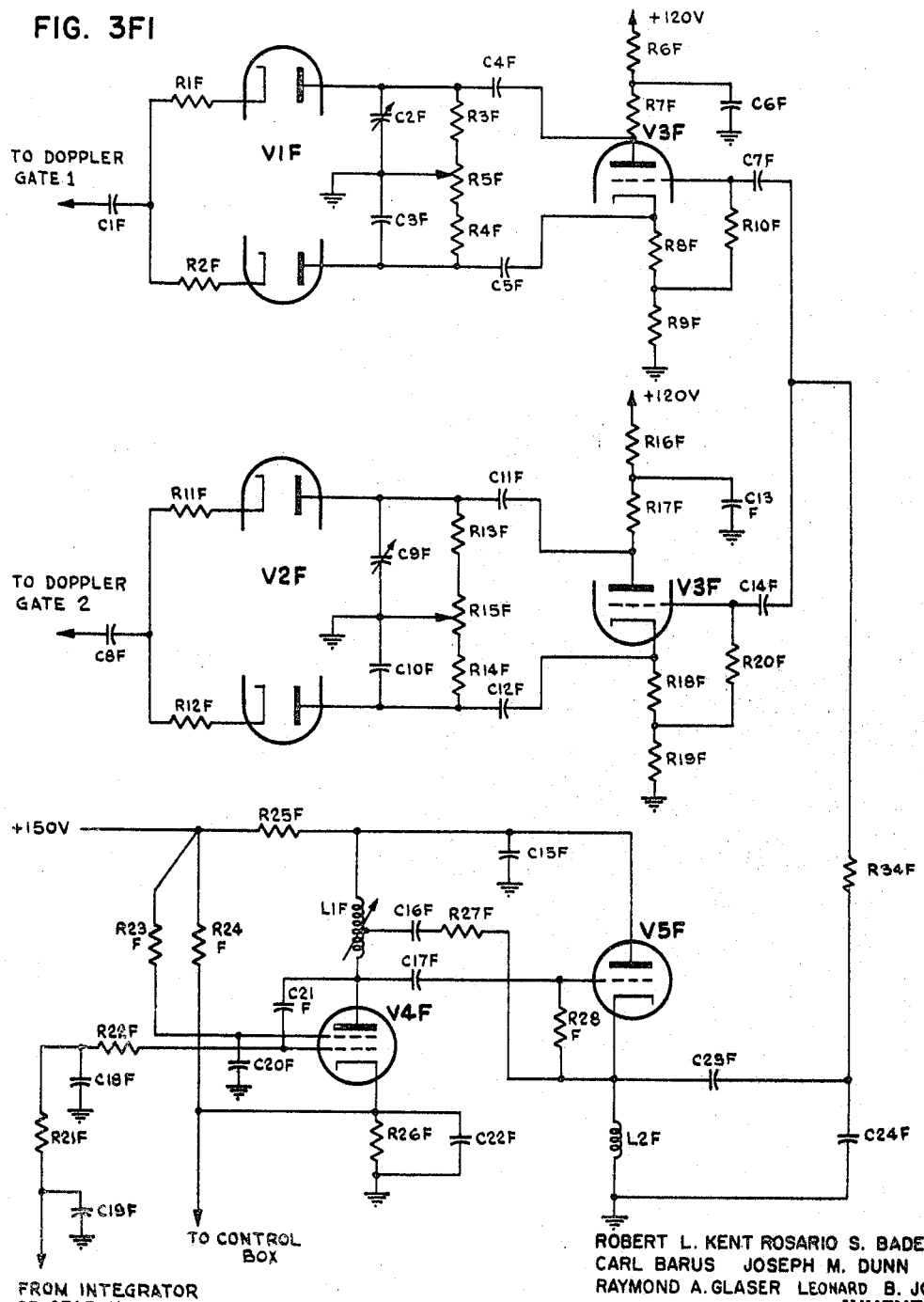
VARIABLE L.O. UNIT - 1
ROBERT L. KENT ROSARIO S. BADESSA
CARL BARUS JOSEPH M. DUNN
RAYMOND A. GLASER LEONARD B. JOHNSON
INVENTORS
BY
ATTORNEYS

VARIABLE L.O. UNIT - 2

ROBERT L. KENT ROSARIO S. BADESSA
CARL BARUS   JOSEPH M. DUNN
RAYMOND A. GLASER   LEONARD B. JOHNSON
INVENTORS

BY
ATTORNEYS

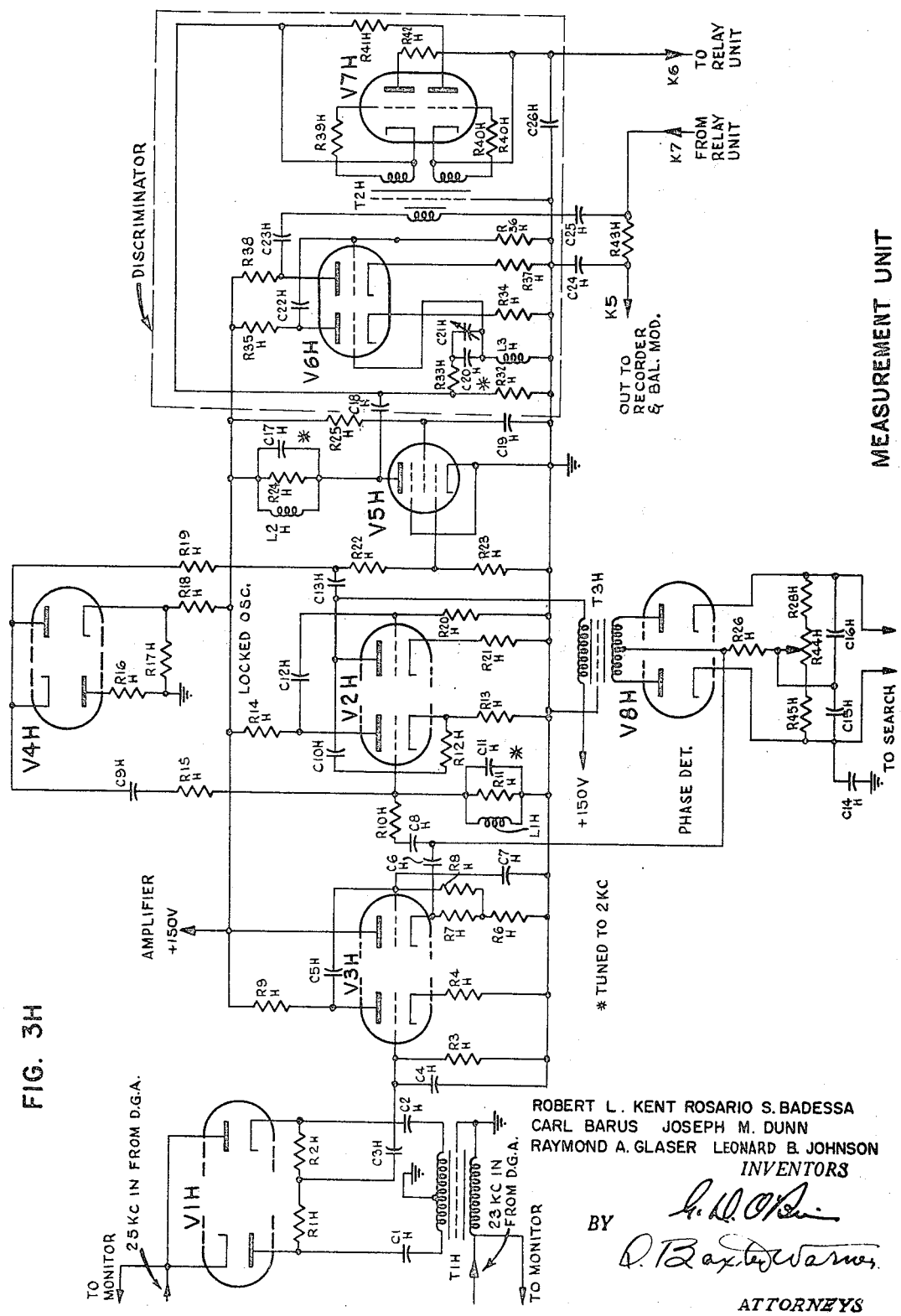

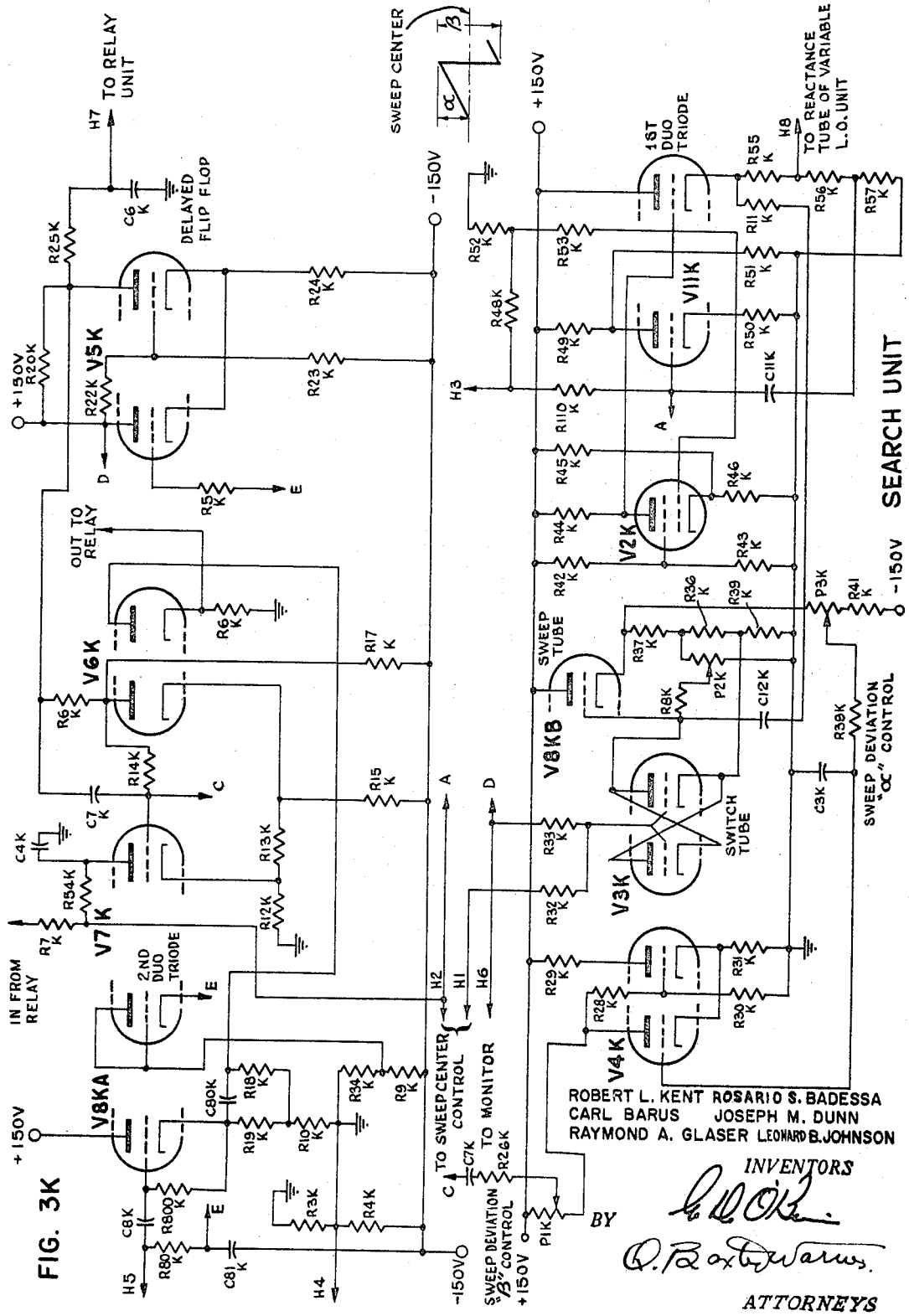

United States Patent Office 3,477,666
Patented Nov. 11, 1969

3,477,666
GUIDANCE SYSTEM
Robert L. Kent, Winchester, and Rosario S. Badessa, West Roxbury, Mass.; Carl Barus, Swarthmore, Pa.; Joseph M. Dunn, Winchester, Mass.; Raymond Arthur Glaser, Kirkland, Wash.; and Leonard B. Johnson, Hingham, Mass.; assignors, by mesne assignments, to the United States of America as represented by the Secretary of the Navy
Filed May 14, 1958, Ser. No. 736,442
Int. Cl. F41g 7/18; G06f 15/50
U.S. Cl. 244—3.19                    13 Claims The present invention relates to an interferometric homing system and more particularly relates to a CW version of such a system particularly adaptable to use in guided missile work wherein interferometric homing methods are to be used. Although particularly adaptable for air-to-air guided missiles of the semiactive type it is also applicable to active and passive missiles and can be utilized in surface-to-air and air-to-surface types and the seeker described herein can be utilized for homing in missiles employing beam riding radar systems, or using target illumination or can be adapted to systems using target characteristics such as electromagnetic radiation or sound for which to home. The invention is especially suitable for use in ramjet aircraft where space limitations at the forward end of the aircraft due to the inherent properties of the ramjet engine are quite limited and wherein the use of two small antennae mounted on each side of the forward fuselage is highly advantageous. The present invention has application to systems of the type described in the prior patent application of Lan J. Chu, Ser. No. 444,931, filed July 21, 1954 for Missile Guidance Method and Apparatus.

Other systems of interferometric homing have been devised such as for example, the system described in the above-identified application, however these systems of the prior art had certain inherent disadvantages. For example, the pulse type of seeker was unable to distinguish or resolve two or more targets at the same range. The pulse interferometric seeker was also particularly vulnerable to jamming from chaff or ground clutter occurring at the range of a target.

Types of seekers other than the phase comparison type of seeker operating on the interferometric principle have been devised, for example, seekers using the methods of conical scan, however these all had inherent disadvantages of requiring movable antennae mounted on stable platforms. The diameter of such an antenna was restricted to the diameter of the missile and hence a resultant inherent limitation in angular sensitivity occurred. The interferometer type of seeker is not limited in this respect in, that its antennas are mounted outside of the missile proper, usually on canards, and the spacing between them is usually somewhat greater than the diameter of the missile. Other disadvantages of such conical scanning type of seekers are that spin errors due to scan are introduced and errors due to radome problems are introduced by this type of scanning. Such types of seekers are of course also very disadvantageous to the ramjet because of the fact that they might block the forward intake and otherwise interfere with optimum operation of a ramjet missile.

Of course it should be understood that the CW seeker itself has some disadvantages for example, the CW system is subject to clutter for beam or rear hemisphere attack positions. It is however completely free of clutter in all forward hemisphere attack positions. Interferometric seekers in general as compared to seekers using the dish and conical scanning principle also present problems in that fixed types of antennas must by their structure have a broad beam width and therefore have the limitation that they have less gain characteristics than the conventional types of dish scanning.

The present invention overcomes the afore-mentioned disadvantages of the prior art and in addition provides for a seeker readily adaptable to the ramjet as well as other types of powered missiles and which will exhibit characteristics of stability, of accuracy in pursuing a homing course for the missile, of relative simplicity and ease of manufacture, and wherein a highly accurate, and relatively small packaged configuration may be fabricated. It should be noted that while the pulse seeker bases its target discrimination properties upon range difference between targets, the CW seeker bases its target discrimination properties upon difference in velocity relative to the missile.

Accordingly, an object of the present invention is to provide an interferometric homing system for a guided missile.

Another object of the invention is to provide a CW interferometric homing system which will have advantages of continuous wave illumination or propagation.

Another purpose of the present invention is to provide a continuous wave interferometric homing system especially suitable for use in ramjet aircraft where space limitations at the forward end of the aircraft are quite limited and wherein the use of a plurality of small antennas mounted on each side of the forward fuselage will be highly advantageous.

Another aim of the present invention is to provide a CW interferometric homing seeker which will be able to distinguish or resolve two or more targets at the same range.

Another object of the present invention is to provide a CW interferometric homing seeker which will have relatively small vulnerability to jamming from chaff or ground clutter occurring at the range of a target.

Another object of the present invention is to provide a CW interferometric homing seeker which may be utilized in air-to-air, air-to-surface, surface-to-air and other types of missiles and which will be especially adaptable for use with guided missiles of the semiactive type.

Another purpose of the instant invention is to provide a phase comparison type of seeker operating on the interferometric principle which will not require stable platforms for mounting movable antennas and wherein the diameter of a missile will not be an inherent limitation.

Another aim of the instant invention is to provide a CW interferometric homing seeker of the phase comparison type which will not present severe limitations in angularly sensitivity.

Another object of the present invention is to provide an interferometric homing seeker suitable for use with continuous wave illumination and wherein disadvantages of spin errors and radome errors will be eliminated.

Another purpose of the present invention is to provide a CW interferometric homing seeker which will not block the forward intake nor interfere with the optimum operation of a ramjet engine.

Another aim of the present invention is to provide a CW homing seeker system which will be readily adaptable for broad beam width use and yet will have relatively high gain characteristics.

Another object of the CW discrimination system of the present invention is to provide capability of detection of targets at a much lower altitude than heretofore could be obtained and further to provide less clutter at such lower altitudes of detection.

Another aim of the present invention is to provide a continuous wave interferometric homing seeker capable of optimum operation in missiles wherein targets will be illuminated with continuous wave illumination and which will be readily adaptable to missiles using the ramjet principle as well as to other types of powered missiles.

Another aim of the present invention is to provide a homing system which will exhibit characteristics of stability, of accuracy in pursuing a homing course for a missile, of relative simplicity and ease of manufacture and wherein a highly accurate and relatively small packaged configuration may be obtained.

Another purpose of the present invention is to provide a CW interferometric homing seeker which can base target discrimination properties upon differences in velocity of targets relative to a missile.

Another aim of the present invention is to provide a CW interferometric homing seeker which will be able to readily and accurately determine and guide a missile to a target interception course with a high degree of probability of kill.

Another object of the present invention is to provide a CW interferometric homing seeker capable of being utilized with a minimum of power output for the CW type of illumination desired and which considering the usual complexity of this type of equipment will present advantages of relative simplicity of circuitry for such a device although insuring maximum speed and accuracy of target detection and which will have features incorporated of readily resuming tracking of a target upon momentary loss of the target and which will readily be able to discriminate as to changes in target direction and respond rapidly to such changes of direction to cause a missile to follow a target homing course.

Another aim of the present invention is to provide a CW interferometric homing seeker working on the Doppler gate principle, providing for a plurality of channels and wherein a special search unit having a memory feature is incorporated capable of rapidly picking up momentarily disappearing targets.

Other objects and many of the attendant advantages of this invention will be readily appreciated as the same becomes better understood by reference to the following detailed description when considered in connection with the accompanying drawings wherein:

FIGS. 1 and 1A present a block diagram of a preferred form of an illustrative embodiment of the present invention showing the units in one axis of control;

FIG. 2 is a block diagram of the Doppler gate section of the preferred embodiment of the continuous wave seeker of the present invention;

Figure 3A:
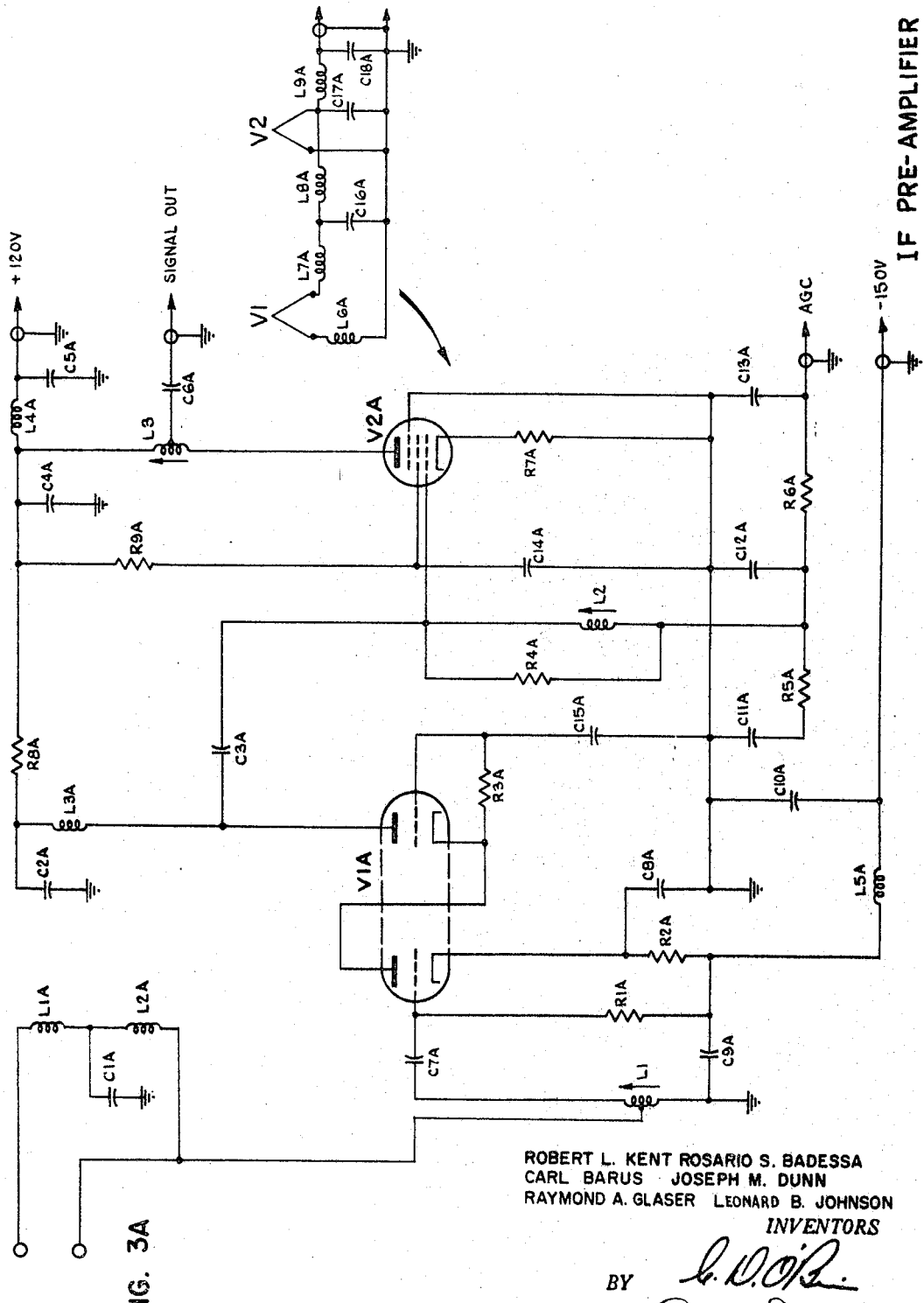
FIG. 3A is a schematic diagram of one of the IF preamplifier circuits of FIG. 1.
Figure 3B:
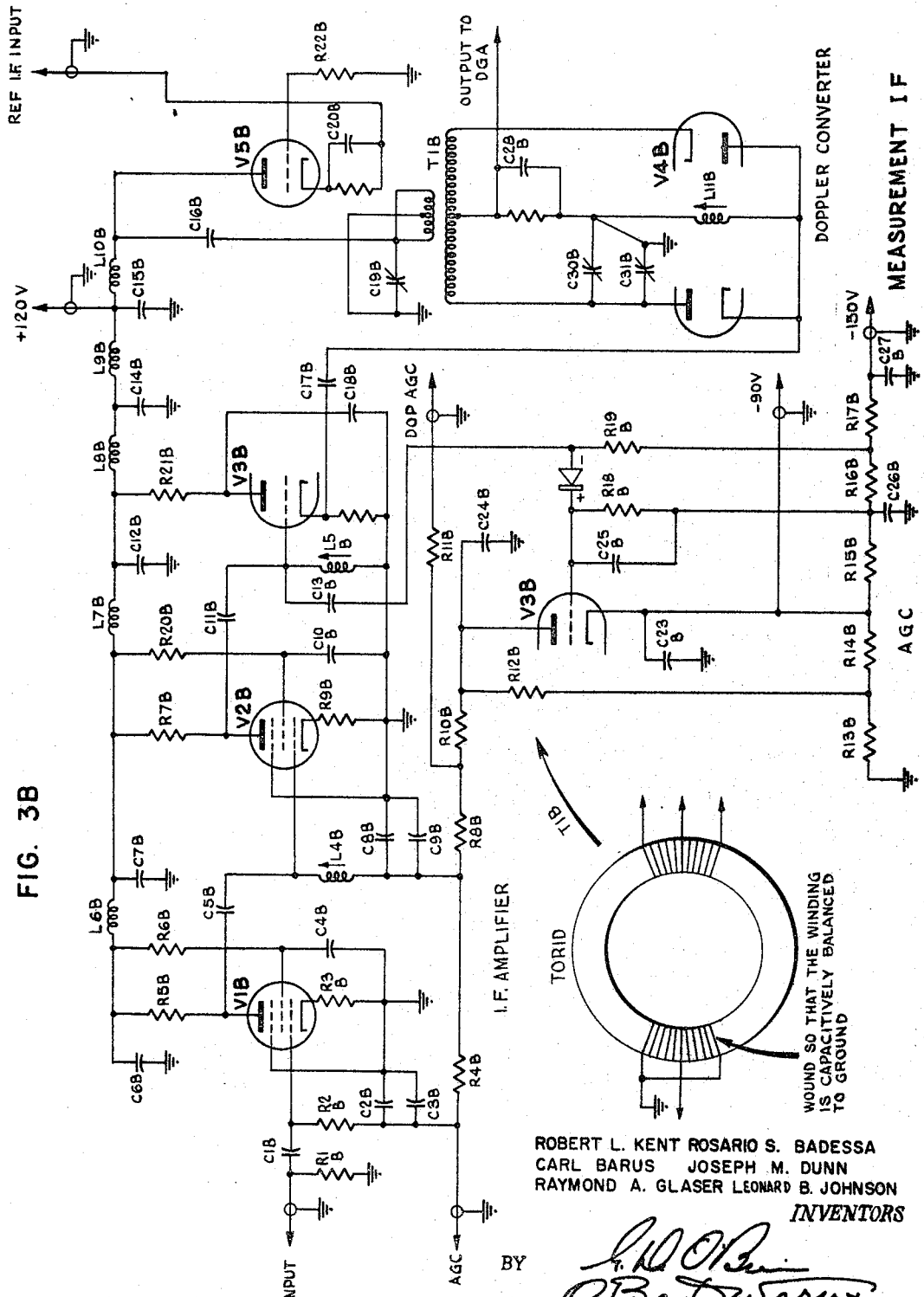
FIG. 3B is a schematic diagram of one of the measurement IF and Doppler converter units of FIG. 1.
Figure 3F:
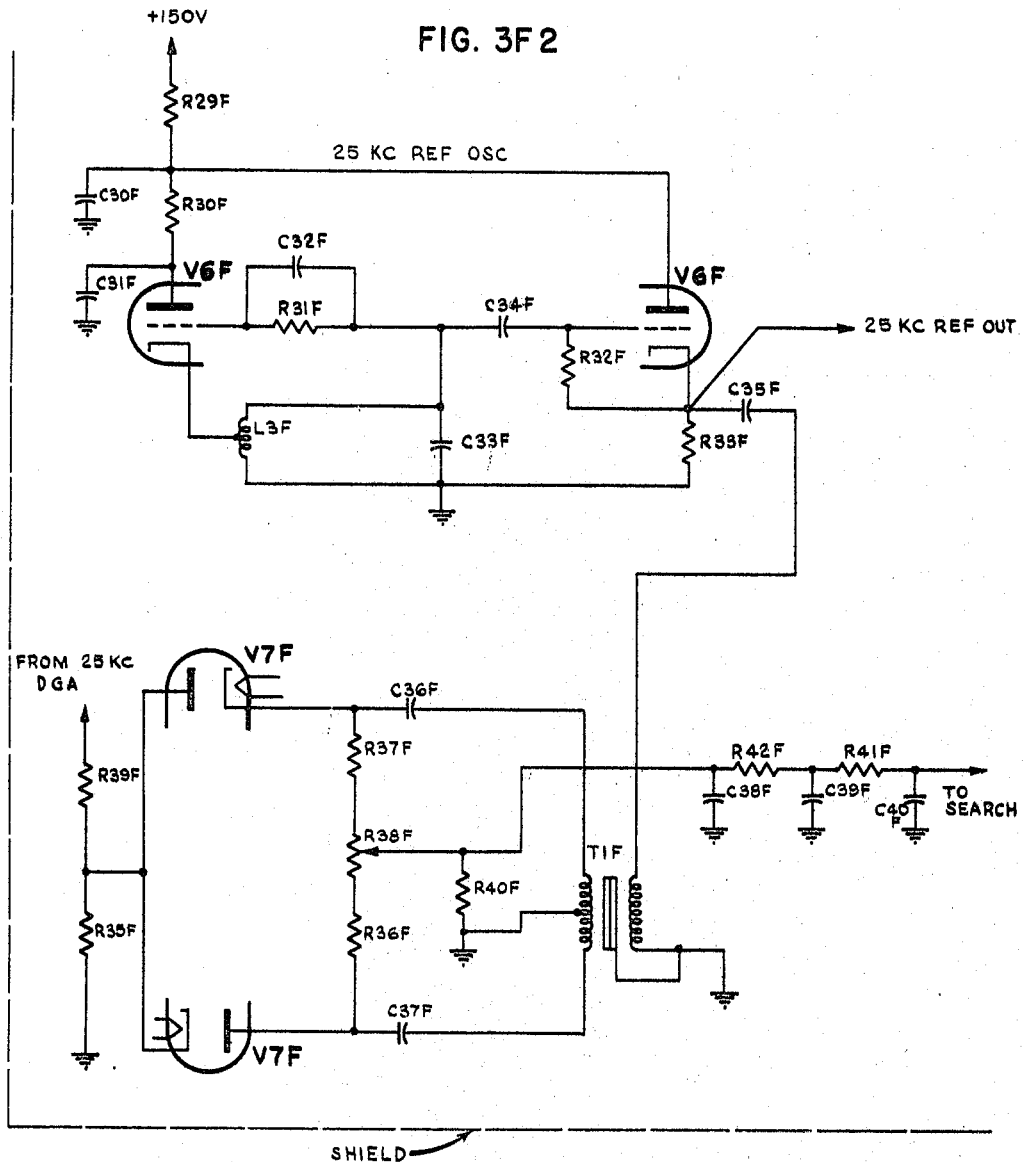
FIG. 3C is a schematic diagram of one of the Doppler gate amplifiers of FIG. 1.
FIG. 3D is a schematic representation of klystron AFC and power supply circuits of the illustrative embodiment of the present invention.
FIG. 3E is a schematic representation of the reference IF circuit of FIG. 1.
Figure 3G:
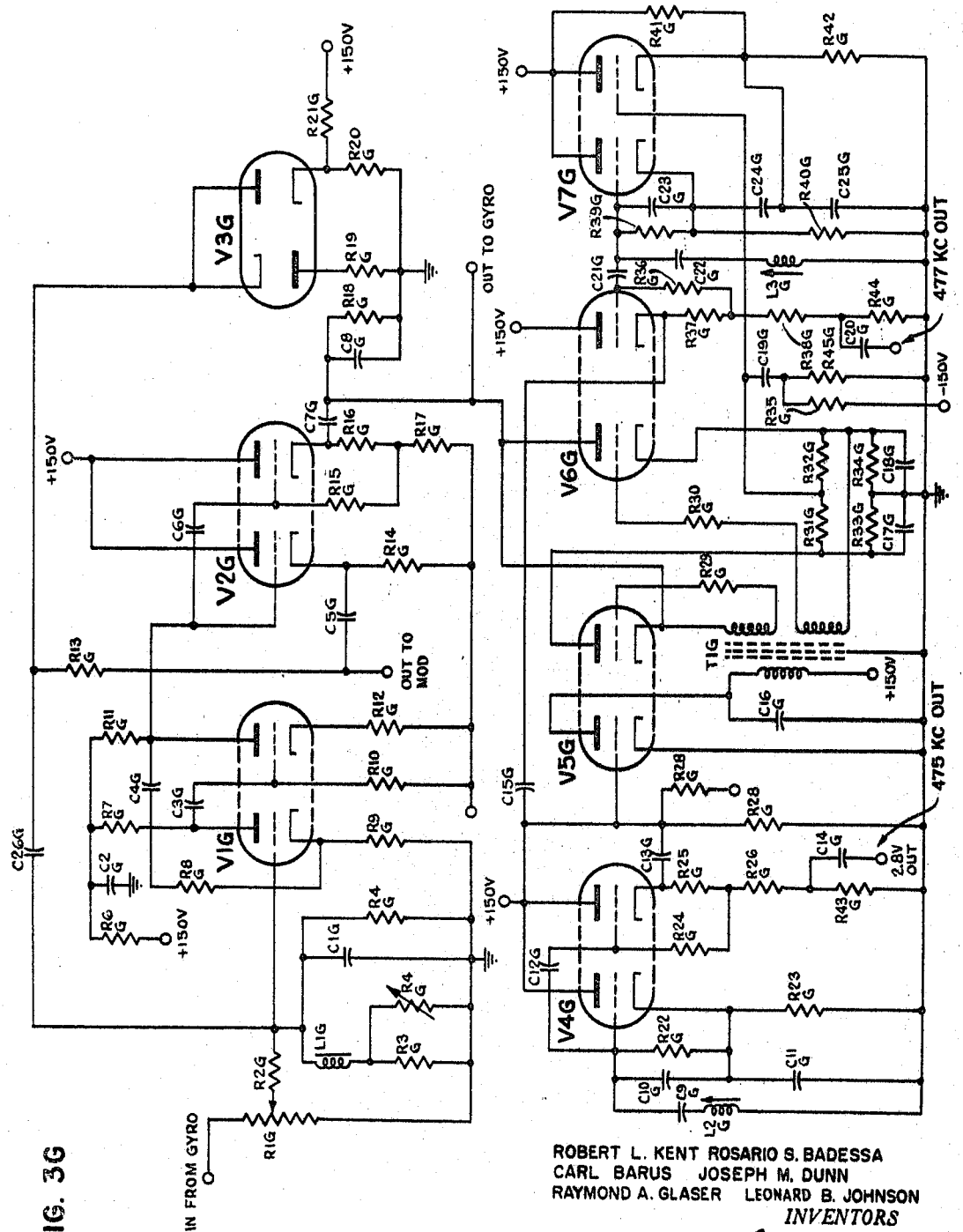

FIGS. 3F1 and 3F2 present a schematic representation of the variable local oscillator unit of FIG. 1;

FIG. 3G is a schematic representation of the fixed local oscillator unit of FIG. 1;

FIG. 3H is a schematic representation of the measurement unit of FIG. 1; and

FIG. 3K is a schematic representation of the Doppler search unit of FIG. 1.

The theory of operation and important points of the present invention will be generally described and following that various figures of the drawings will be described in greater detail.

Although, the principles of the present invention have wide and almost universal application to certain interferometric homing techniques, this technique lends itself particularly to operation as an X-band, semiactive, phase-rate seeker, designed for use in an air-to-air missile, the parent aircraft carrying a CW transmitter for illumination of the target. The diagram of FIG. 1 shows only the elements required for one plane of measurement, although some of these are common to both the pitch and yaw planes. Each of the four measurement channels, in a complete two-plane system is fed from its own fixed antenna and includes IF gain at 60 mc.p.s. (megacycles per second), Doppler conversion, and Doppler gating. The major portion of the overall gain occurs in the Doppler-gate narrow-band amplifier. Following the Doppler gate, the two yaw-plane channels are compared and the differential phase rate:

$$\dot{\phi} = 2\pi \Delta f = \frac{2\pi d}{\lambda} \dot{\beta} \cos \beta$$

is measured in combination with an additional injected phase rate proportional to the missile angular velocity, $\omega$. Identical circuitry is used to measure pitch-plane phase rate. In the above expression, $\beta$ is the lead angle measured in the plane containing the antenna pair and the line of sight; $d/\lambda$ is the antenna spacing in wave lengths.

The illuminating transmitter for the system is assumed to be located in the parent aircraft although it is within the scope of the invention to locate it on the ground, in the missile or in other places. The antenna must be kept on target by some automatic tracking system, which may either be a pulse or CW radar. Ideally, a CW radar would be used although a conveniently available pulse tracking radar could be utilized. In order to conserve space in the parent aircraft, the CW illuminating signal may share the antenna of the tracking radar. With a frequency separation of several hundred megacycles per second, such an arrangement, using wave-guide filters for isolation of the two signals would be feasible. Similar filters would, of course, be necessary in conjunction with the receiving antennas of the missile.

Since both AM and FM noise on the transmitted signal can cause difficulty to the seeker, a low-noise transmitter would be desirable. A Raytheon QK-259, X-band, CW magnetron, with a power output of 50 to 100 watts appears to provide a satinsfactory source of power for target illumination. The effects of frequency pulling due to scanning and training of a dish within the radome may necessitate the use of frequency stabilization, which can be provided without greatly complicating the transmitter installation.

As stated, one of the two pairs of measurement channels required for a complete seeker is shown in FIG. 1. In each measurement channel a balanced mixer, employing a modified form of waveguide magic-T and a pair of silicon crystal diodes, may be used to heterodyne the incoming signal to a frequency of 60 mc.p.s. The incoming signal consists of direct spill-over from the transmitter together with the target echo, which appears effectively as a single side band on the spill-over. The echo side band may be separated from the spill-over carrier by the so-called "Doppler" frequency resulting from the relative velocities of missile, target and illuminator.

The balanced mixer may be followed by a low-gain 60 mc.p.s. preamplifier which, together with the mixer, may be designed to be housed directly in the antenna pod. The measurement IF amplifier which may be located in the seeker proper, may provide a small amount of additional gain prior to conversion to Doppler frequency. Conversion in each measurement channel may be obtained by mixing the signal in that channel with a "reference" signal obtained via a tail antenna and heterodyned to 60 mc.p.s. in a manner identical to that in the measurement channels.

Two considerations may limit the amount of measurement IF gain that is used. First, the spill-over level must remain well below that of the reference signal at the Doppler converters in order to insure linear operation of the converters. Second, strong unwanted signals, such as ground or a sea clutter, must not be allowed to overload the receiver ahead of the Doppler gate. Since the worst case of the former requirement (maximum spillover) will probably permit considerably less IF gain than will the latter (strong clutter), control of the IF gain by the spill-over may be provided. Since noise originating at the input of the Doppler gate may be appreciable, as much gain ahead of the Doppler gate as can be permitted by the spill-over level is desirable.

When the seeker begins searching for the target immediately after boost, the target will be at maximum seeker range, and the missile may be in the main transmitting beam. This condition could result in receiving an echo power in the preferred embodiment shown as low as $10^{-16}$ watts with a spill-over power as high as $10^{-5}$ watts. If the spill-over is amplified to a level of one volt, a three-microvolt echo signal would result at the Doppler converter, and a one-to-two microvolt signal at the converter output. This level of Doppler signal is quite low from the point of view of proper functioning of the Doppler-gate section. However, it is highly improbable that the missile will lie in the main transmitting beam after boost which would be the worst possible case. Furthermore, even if it did, the spill-over level would decrease rapidly as the missile drew away from the transmitter. The automatic gain control shown in FIG. 1 enables the seeker to take advantage of reduced spill-over by increasing the IF gain.

Because of the danger of overload on clutter signals at the input to the Doppler gate, maximum measurement IF gain should be no more than required to insure satisfactory performance of the Doppler gate with minimum receivable echo power. Once the gate is locked on a strong target echo, the seeker should again be able to take advantage of this favorable situation by reducing the measurement IF gain and thus becoming less vulnerable to clutter overload (assuming that the target Doppler frequency differs appreciably from that of the clutter tending to cause overload). This may be accomplished in the seeker by applying to the measurement IF amplifier a second AGC voltage taken from the detected output of the Doppler gate amplifier.

In the reference channel, a preamplifier which may be identical to those in the measurement channels may be followed by a high-gain IF amplifier to bring the signal to a level appropriate for use in the automatic frequency control circuit and the four Doppler converters, two of which are shown in FIG. 1.

Since it is highly probable in any homing flight that the missile will at some time be outside the main transmitter beam while several miles from the transmitter, the problem of obtaining adequate power at the tail antenna may be a serious one. Several possible methods may be utilized for increasing the reference signal-to-noise ratio. An auxiliary wide-beam transmitting antenna could be used and the resulting irregularities in the main beam eliminated by cross-polarizing the auxiliary antenna. Another method would be to narrow-band the reference channel after conversion to a second, lower, intermediate frequency. Although the latter expedient might seriously limit the AFC pull-in range, this may prove to have no detrimental effect.

A reasonably wide AFC pull-in range is ordinarily considered desirable because of the danger that AFC lock will be lost during the shock of boost. Unless remote-controlled mechanical tuning of the local oscillator were employed, considerable drift of the oscillator cavity with respect to the transmitter might be expected between the times of take-off and missile-launch. Consequently, appreciable AFC voltage may be developed. If this voltage were lost after firing, the oscillator would snap to its uncontrolled natural frequency, which might be beyond the pull-in range. An integrator capable of holding the oscillator within a pull-in range for several seconds could be incorporated in the AFC circuit (see FIG. 3D). This integrator will also function to advantage toward the end of the missile flight as the reference signal becomes weak and fading occurs. Holding the AFC reliably by integration and/or ruggedization, the pull-in range loses importance, and the narrow-banding of the reference channel is facilitated.

As shown in FIG. 1, the output of the reference channel is used as a "local oscillator" drive for the Doppler converters. In general, phase rates exist between pairs of spill-over signals and between each spill-over signal and the reference. These phase rates should not be allowed to appear as phase modulation on the converted Doppler signals. To avoid such intermodulation between spill-over and echo, two measures may be taken. First, by the appropriate use of AGC it can be insured that the reference signal is much stronger than the spill-over so that approximately linear conversion takes place. Second, the Doppler converter may be designed as a balanced mixer in order to suppress residual intermodulation. The balanced mixer also will reduce AM noise on the reference signal.

The use of a non-ideal limiter in the reference channel ahead of the Doppler converters might also produce differential phase shift as a function of reference-signal amplitude. In this case, Doppler-band AM noise on the reference signal might cause additional difficulty. The use of a limiter may be avoided by using AGC in the reference IF amplifier, with attention to minimizing phase shift due to gain change.

The functions of the Doppler gate section of the seeker are to select the desired target from aong all Doppler-shifted signals picked up by the receiver and to provide a tunable narrow pass-band to improve signal-to-noise ratio. As shown in the block diagram of FIG. 2 comprising the Doppler gate where the tracking loop is presented in more detail than in the seeker block diagram of FIG. 1, the gate is essentially a superheterodyne receiver which can be tuned to any frequency within the Doppler band (approximately 10 to 70 kc.p.s.). The first intermediate frequency, 500 kc.p.s. in this case, must be above the Doppler band in order to avoid images. The gate may include conversion to a second intermediate frequency, 25 kc.p.s., at which frequency the required gating bandwidth is more easily obtained and center-frequency drift more easily controlled.

The CW seeker of the invention may depend upon differences in velocity for target discrimination, utilizing the fact that targets moving at different velocities will produce different Doppler frequencies. The Doppler gate circuits may be designed so that targets having velocity differences as close as 10 feet per second (200 c.p.s.) can be resolved. In addition to the use of narrow-band amplifiers an automatic tracking system may be used capable of responding to the various changes in Doppler that result from target maneuvers and target echo fluctuations.

The output of the Doppler converters may be amplified in the wide-band Doppler amplifiers and then mixed to the first intermediate frequency of 500 kc. by means of the variable local oscillator. After further amplification at this frequency, they may be mixed again to 25 kc. in channel No. 1 and 23 kc. in channel No. 2. For this purpose, a 475 kc. signal and a 477 kc. signal may be derived locally in the fixed local oscillator unit. After passing through the first narrow band 25 kc. amplifier, the signal of channel No. 1 may be used to drive the phase detector of the AFC loop and after passing through the second narrow band 25 kc. amplifier, it may be sent to the measurement unit. In channel No. 2 the signal may undergo the same degree of filtering as in channel No. 1 and be sent to the measurement unit directly.

The tracking loop (see FIG. 2) may cause the variable local oscillator to change frequency in such a manner that the Doppler signal stays at all times within the pass band of the narrow band amplifiers. For this purpose a locally generated 25 kc. oscillator may be used as a reference and may drive the phase detector. The integrator may serve as a memory device so that momentary loss of signal may cause the local oscillator to remain at the same average frequency it had before the loss occurred. In this way the loop will be ready to relock the moment the signal is restored.

The function of the fixed local oscillator unit is to provide high-level output signals at 475 kc.p.s. and 475 kc.p.s. plus 2 kc.p.s. minus $k\omega$, where $\omega$ is the missile rate of turn. These signals are used to heterodyne the respective Doppler gate signals. A 2-kc.p.s. "reference" oscillator is shifted in frequency by an amount proportional to $\omega$ by introducing into its resonant circuit a current which is 90° out of phase with the oscillator voltage. The injected current is obtained from a gyro, which obtains its excitation from the reference oscillator and produces an output proportional to the missile rate of turn. The 475 kc.p.s. output is obtained from an independent fixed oscillator. A second oscillator is locked by means of a phase loop to a frequency 2 kc.p.s. minus $k\omega$ above that of the independent oscillator (see FIG. 1). An integrator in the loop extends the lock-in range to accommodate the frequency drifts which occur over the desired range of operating temperatures.

The measurement unit of the CW seeker is shown in the system block diagram of FIG. 1A. Channels 1 and 2 are compared in a phase detector type mixer, which yields an output whose short time average frequency deviation from 2 kc.p.s. is the desired error signal for the missile control system. In order to measure this frequency deviation with the discriminator centered at 2 kc.p.s., it is necessary first to remove amplitude variations from the incoming signal. This is accomplished by means of an injection-locked oscillator, which produces a constant amplitude output at the same average frequency as the incoming (2 kc.p.s.$+\Delta f - k\omega$) signal. Frequency "spikes" on the incoming signal are smoothed by the low-pass response of the locked oscillator to frequency modulation.

Coherence between input and output of the locked oscillator is used by the search unit as an indication of the presence of a signal. The search unit in turn controls an interrupter relay in the measurement unit, allowing a command signal to be passed only while a target signal is present at the locked oscillator. This requires the presence of signals in both Doppler gate channels of the seeker. Following the interrupter relay is a 1 c.p.s. two-section low-pass filter, as required by the missile control servo loop. A balanced modulator and tuned amplifier provide a suppressed carrier command signal for the control servos. If desired, in order to meet possibly stringent stability requirements of the locked oscillator, the natural frequency of the locked oscillator may be automatically adjusted initially to the frequency of the 2 kc.p.s. reference oscillator prior to launching of the missile. After removal of the reference signal at the time of launch, the locked oscillator maintains constant frequency until a signal appears in the Doppler gate and then automatically would track the average phase rate of the signal.

Acting upon the assumption that in tactical use a missile carrying the seeker of the present invention will be launched prior to acquisition of the target Doppler signal, the search unit must, therefore, lock the Doppler gate to the signal in the shortest possible time after launch and must relock it, should loss of lock occur. Because of the relatively short time allowed for locking and the wide range of possible Doppler frequencies, the probability of lock must be kept high and at the same time the probability of false lock must be at a minimum. For this reason, the utilization of two channels as shown in the preferred embodiment herein is desirable. In a single channel system, the fact that the AFC is able to lock on a received signal for some specified duration is generally considered sufficient evidence that the signal is a desired one. In the present system, however, the additional condition must be met that it be present in both channels. One obvious advantage of such a condition is that false locks arising from some disturbances in a single channel, such as a microphonic, for example, are eliminated. Furthermore, a signal derived from two channels loses in the combining process that portion of its frequency modulation common to both. This enhances its synchronous quality by a means independent of AFC action and makes easier the distinction between noise and signal.

A locked oscillator furnishes a convenient means of measuring the synchronous quality of the signal. As shown in FIG. 1, the oscillator is locked by the 2 kc.$+\Delta f - k\omega$ signal of the measurement unit. A phase detector in the search unit measures the phase difference between it and the locking signal. The lock-in range of this oscillator is so chosen that changes in $\Delta f - k\omega$ have negligible effect on the lock. In the presence of a clean signal, the locked oscillator is in phase with the locking signal, and a large negative DC voltage appears at the output of the phase detector. In the presence of random noise, the phases between the locking signal and the locked oscillator are essentially independent, and the phase detector output consists of random noise with no DC component. The magnitude of the DC voltage appearing at the output of the phase detector is thus a measure of the signal quality. Furthermore, since a clean signal produces a negative voltage out of the phase detector and never a positive voltage, the polarity variations of the noise during sweep provide a means for optimizing the sweep speed during the sweep cycle. For example, when the phase detector output is positive, the sweep can momentarily be speeded up, since no signal is present, and when it is negative, the sweep can be slowed down, since the presence of a signal is possible. This is essentially the sweep system used. It may be found desirable to stop the sweep completely on every negative signal out of the phase detector and to advance the sweep at a rate proportional to the size of the positive ones during their occurrence. In the presence of true random noise, such a sweep appears perfectly smooth when viewed on an oscilloscope, although actually it is completely stopped 50% of the time.

The reduction in the sweep period can be obtained by sweeping only over that portion of the Doppler band where the signal is most likely to exist. This presupposes target velocity information prior to launch of the missile, but the precision of the information need not be high. Tentatively, a sweep range covering one-third of the Doppler band may be chosen as sufficient for any particular target. To allow for inaccuracies in the setting of the sweep center as well as for large changes in Doppler during the run, the sweep of the present invention has been designed with a self-centering feature. Once lock been achieved, resweep in case of unlock occurs about a center located at the point the signal was lost and not about the initial sweep center setting, A "kickback" precedes such a sweep. This consists of a short retrace of perhaps 2 kc.p.s. so that the region most likely to yield the signal will be the first to be swept through.

The main features of the search are illustrated in the block diagram of the CW seeker shown in FIG. 1. The initial sweep center control may be a source of DC voltage with manual control. Before launch, it fixes the output voltage of the AFC loop integrator at a level corresponding to the desired sweep center frequency. After release, the integrator serves as a memory device and utilizes this voltage as the starting point of the sweep. The sweep itself is generated by integration of the positive signals out of the search phase detector as was previously explained. A rectifier is used to block the negative output pulses.

The AFC loop, which is in a closed condition during sweep, can lock and hold a signal through which it is tuned before the sweep is actually removed. If a signal is present in both channels, a negative voltage appears at the output of the phase detector and the sweep is temporarily removed as an aid in preventing unlock. If the synchronous component is sustained for some preset interval, such as 0.5 second, the delayed flip-flop operates. Should the component disappear before the 0.5 second interval is complete, as evidenced by a positive voltage appearing at the phase detector output, the sweep will resume. Operation of the delayed flip-flop is considered an indication that true lock has been achieved. Its operation results in the removal of the sweep voltage to the intergrator and its continued removal for at least 0.5 second after a loss of true lock. If unlock does occur, a kickback results as previously explained, with resweep about the new sweep center.

Command information is sent to the missile controls only during "on-target" periods of the flip-flop. Since these are the periods during which the locked oscillator is locked to the 2 kc.$+\Delta f-k\omega$ signal, an "on-target" condition is a period during which, of necessity, changes in $\Delta f-k\omega$ are transferred to the oscillator. Hence, these are the periods during which a true command signal is produced by the seeker.

Although, not to be restricted thereby, the CW seeker of the illustrative embodiment is designed to operate on Doppler frequencies which fall in the range 10 kc. to 70 kc.

Having now given an overall description of the features of the inventive CW interferometric homing seeker, the several figures of the drawing will now be explained in detail bringing out in particular the novel features of the invention apparatus.

Referring to the drawings in greater detail and in particular referring to FIG. 1 assume the presence of an enemy target and the missile headed on a particular course. It should be noted that the block diagram of FIG. 1 represents only one axis of propagation to and from the target, a substantially identical apparatus will be utilized to determine the target interception course in a plane normal to the plane of the apparatus of FIG. 1.

In FIG. 1 the two antennas are represented in the upper left and right-hand corners of the drawings as channel 1 and channel 2 respectively. In general description of only one of the channels will be made hereinbelow except where differences in operation of the channels occur. The input target signal coming into channel 1 is received at the antenna and drawn through a 10.2 km.cps. filter 11. The purpose of this bandpass filter 11 is to exclude other X-band signals from the mixer 12. The X-band signal which is reflected from the target and passes through the 10.2 kmc.p.s. filter 11 is mixed in crystal mixer 12 with a signal locally generated in an X-band local oscillator 100. The difference frequency from this mixer is 60 mc. and enters an intermediate frequency preamplifier 13 tuned to 60 mc. The 60 mc. signal is further amplified in a measurement intermediate frequency amplifier 14 and 54 respectively in each channel. These amplifiers 14 and 54 have automatic gain control to prevent overload by spill-over signals. The output of the 60 mc. measurement IF amplifier 14 goes to a Doppler converter 15 which mixes the 60 mc. signal with a second 60 mc. signal obtained from a reference channel fed from a rear antenna 3. The difference frequency between the measurement channel signal and the reference channel signal is equal to the Doppler shift in frequency caused by relative motion between missile and target. The Doppler amplifier 17 is a wide band amplifier having a pass band from approximately 2 to 60 kc.p.s. The Doppler amplifier bandwidth is such that it is capable of passing all Doppler signal frequencies obtained from targets which have a closing or opening range rate with respect to the missile. The converter 15 output is fed into Doppler amplifier 17 and the output of the Doppler amplifier 17 is again heterodyned with a second local oscillator 75 in mixer 110 to a frequency of 500 kc.p.s. The local oscillator involved in this mixing operation is variable and is controlled in a phase lock frequency loop such that the difference frequency is maintained at 500 kc.p.s. This signal at 500 kc. is further amplified in 500 kc.p.s. amplifier 18 and mixed again in mixer 19 to a lower frequency at which narrow banding takes place. This lower frequency is 25 kc.p.s. in channel 1 and 23 kc.p.s. in channel 2. The local oscillator frequency introduced into channel 1 is a fixed 475 kc.p.s. oscillator frequency from oscillator 115. The corresponding frequency introduced into channel 2 consists of the sum of the 475 kc.p.s. frequency and a 2 kc.p.s. oscillator 107 which is tuned by tuning control 20a by means of a signal which is a measure of $\omega$, the missile rate of turn. The signals in channels 1 and 2 prior to mixing down to 23 and 25 kc. respectively, differ in frequency by $\dot{\phi}$ the phase rate between the channels which is a measure of the turning rate of the line of sight between missile and target. Following the mixing operation to 25 and 23 kc., the difference between channels is 2 kc. minus $$\dot{\phi} \text{ plus } k\omega$$

That is, the difference between channels contains both bearing rate and $\omega$ that is, missile rate of turn information. This appears in mixer 30. The purpose for the introduction of a 2 kc. difference between chanels is to facilitate comparison of channels which will occur in a mixing operation. Prior to channel comparison channels 1 and 2 are narrow banded to approximately 200 cycles in the 25 and 23 kc. narrow-band amplifier. That is, the bandwidth of the stages in the narrowband amplifiers which control the bandwidth of the system is approximately 200 cycles. The tuned circuits narrow the bandwidth to that extent. This has the purpose of eliminating extraneous noise and also of providing some resolution between targets of different velocities. This is known as the Doppler gate or velocity gate feature of the continuous wave interferometer seeker.

In greater detail, the so-called fixed local oscillator unit 120 is that unit which has for its outputs two signals at 475 kc.p.s. and approximately 477 kc.p.s. The 475 kc. output is a fixed frequency coming from a fixed tuned oscillator 115. The 477 kc. output is obtained from an oscillator 116 which is in a phase locked loop. The frequency of the 477 kc. oscillator 116 is phase locked to a frequency differing from the 475 kc. oscillator 115 by 2 kc. minus $k\omega$. This is accomplished by means of a nulling servo type of feedback loop in which the 477 kc. oscillator 116 is compared in a mixer 20 with the 475 kc. oscillator 115. The difference which is near 2 kc. is then compared in phase in a phase detector 117 with the output of a 2 kc. oscillator 107 which has previously been tuned by injection of the missile rate of turn $\omega$. A voltage proportional to the phase difference between the 2 kc. oscillator signal and the output of the mixer 20 which is also about 2 kc. is introduced into an integrator 22 and the output of the integrator 22 is used to electronically tune the 477 kc. oscillator 116. In other words the 477 kc. is not necessarily exactly at 477 kc. but the integrator 22 action insures that there will be a 2 kc. difference between the fixed oscillator 115 and the oscillator 116. The difference is actually held to 2 kc. minus $k\omega$ in this manner. Thus the electronic tuning is responsive to the integrated signal coming out of the integrator 22. Integrator 22 may be a simple RC circuit.

The signals in channels 1 and 2 as they come out of the 25 kc. and 23 kc. narrow-band amplifiers 23 and 24 are brought together and mixed in the so-called channel comparison mixer 30, located in the measurement unit 25. The output frequency of the channel comparison mixer 30 is equal to 2 kc. plus $\dot{\phi}$ phase rate minus $k\omega$. The desired quantity to be measured is therefore the difference in frequency from 2 kc. in the output of the channel comparison mixer 30. This signal is used to injection lock an oscillator 33 in the vicinity of 2 kc. The output of locked oscillator 33 is then fed to a frequency discriminator 40 tuned to 2 kc. center frequency such that deviation from the 2 kc., plus or minus, produces positive or negative DC output from the discriminator 40 which is therefore a measure of $\dot{\phi}$ minus $k\omega$, the desired quantity.

The discriminator output 40, which is DC, is in the presence of a target signal passed through the interrupter relay circuit 41 filtered in a low-pass filter 31 whose cutoff is approximately 1 c.p.s. and then modulated and amplified. The interrupter relay 41 has the purpose of preventing false information which might be present at the discriminator 40 output in the absence of the true target signal from passing through to the command signal and thus misguiding the missile. In other words the interrupter relay 41 is open if the information is determined to be false information, that is not true target signal information. The interrupter 40 obtains its control signal from the search unit 130 which will be later described in detail. The output of low-pass filter 31 is reintroduced to a balanced modulator 42 and is used to suppressed-carrier modulate a 2 kc. signal in such a way as to produce a suppressed carrier whose modulation is the desired information. This suppressed carrier is the signal which is required by the hydraulic servos in the missile control apparatus. The command signal arrow of FIG. 1A goes to the hydraulic servos to actuate the control surfaces in response to deviation from the interception course to the target.

Going into details of the operation of the search unit 130 which controls, among other things, the interrupter relay 41 in the measurement unit, the input signals to the search unit 130 consist of the output of the channel comparison mixer 30 and the output of the 2 k.c.p.s. injection lock oscillator 33. The output of mixer 30 is on the line designated at 32 and the second input to phase detector 43 is from the locked oscillator 33 and comes in on line 34. These two inputs comprise the locking signal and the output of the locked oscillator, the locking signal being on line 32 and the oscillator output being on line 34 and in the presence of a target echo signal they will be approximately in-phase. These two signals (on lines 32 and 34) are compared in phase detector 43 in search unit 130 and the conditon of in-phase or nearly in-phase results in a decision by the search unit 130 that a target is present which causes the interrupter relay 41 to allow command signals to pass to the hydraulic servos. The signals coming in on line 32 and line 34 are approximately in-phase in the phase detector when the search unit 130 determines that there is a real target. A negative voltage at the output of the phase detector gives an indication that these signals, the locking signals and the oscillator signals, are in-phase. That is, the presence of a signal in measurement channels 1 and 2 causes a clean somewhat sinuosidal type of output signal from the channel comparision mixer. In the absence of a signal the output of the channel comparison mixer 30 is merely a narrow band of noise centered at 2 k.c.p.s. This band of noise is incapable of locking the injection lock oscillator 33 and hence there is no definite phase relationship maintained between the locking signals and the oscillator voltage in the absence of the signal. That is, it would not be likely that an in-phase relationship coming in on line 32 and line 34 would result, hence no signal output would appear at the phase detector 43. Under the no signal condition, the output of the phase detector 43 would have no DC component and would be merely a low frequency noise waveform centered about zero voltage. The DC voltage in the presence of the signal is of the order of negative 6 or 7 volts. The search unit 130 serves the dual purpose of controlling the interrupter relay 41 in the measurement unit and of controlling the tuning of the variable local oscillator 75 in the variable local oscillator unit. In the absence of a signal, that is, before a signal has been detected by the seeker, the search unit 130 causes the local oscillator 75 to be swept over the band of frequencies in which a signal is expected. This is done by taking the AC out of the phase detector 43 of the search unit and rectifying or selecting the positive portions of this AC waveform using each positive going portion of the phase detector 43 output to advance the local oscillator frequency a small amount. In other words the sweep is not a uniform linear sawtooth type of sweep, but is advanced in positive incerements by the positive portion of the phase detector output. This is done because it is then possible to slow down this sweep when the presence of a signal is indicated. This improves the lock-on ability of the search until 130. As was pointed out hereinabove the output of the phase detector 43 will begin to go negative when a signal appears in the measurement channels. As this occurs the number of positive portions to the phase detector 43 output is reduced and the stronger the target signal, the more negative the phase detector output will be and the less positive the contained portion will be. That is, as the sweep approaches the target this negative signal goes more negative. The positive portions are rectified and integrated, that is, the positive portions which are used to advance the local oscillator in the absence of a target signal. They come out of the phase detector line 38. In other words, negative output from the phase detector 43 on line 38 indicates presence of a target signal, while AC output on line 38, which contains some positives, indicates absence of a signal and is used to advance the sweep. The AC signal on line 38 is rectified in rectifier 44 which passes only positives from phase detector 43. This system of non-uniform sweeping or searching over the Doppler band has been shown experimentally to be superior in acquisition ability to a conventional uniform sawtooth type of sweep. The non-linearity then helps in this sweep and helps in the lock-on primarily. The general effect is that the sweep is slowed down when it appears that a target might be present. If a target is found to be actually present, the sweep is stopped completely and the local oscillator is locked to the target signal and tracks it from that point on.

The action of the search unit 130 in stopping the sweep when a target signal is found to be present will be explained now. In the presence of a target signal the sweep is initially slowed down by the action of the search unit 130 in integrating fewer positive pulses out of the phase detector 43. This slowing down of the local oscillator sweep permits time for the build-up of a negative voltage in the output of the phase detector 43, if there is a target actually present. The sweep is generated as follows: The initial sweep center control voltage 80 is used to center the sweep in the frequency band at which target signals are expected. This is determined by the tactical situation and type of aircraft expected to be encountered. In other words a DC bias voltage is preset before the missile is launched. The DC bias voltage is shunted across the integrator output at 81 and fed to the electronic tuning control 106 in the variable local oscillator unit. This bias voltage, which is stored after removal of the source at launch, sets the frequency range over which the local oscillator can be swept. This local oscillator 75 is swept between certain frequencies wherein search is made. The entire frequency band over which target signals can appear is about 60 kc. The initial sweep center control voltage 80 is set in such a way that the region over which the oscillator sweeps is restricted to about a 20 kc. band somewhere in this 60 kc. Doppler band. The sweeping is done by means of the electronic tuning control which is in actuality a reactance tube device. The frequency of oscillator 75 is then changed by varying electronically one of the reactances in its tuned circuit. For example, a reactance comprising a vacuum tube would be varied. Impressing a sawtooth sweep voltage upon the grid of the reactance tube might vary the effective reactance seen by the tuned circuit of oscillator 75 in such a manner as to produce a linear change in frequency. That is shown in detail in FIG. 3F. Thus, the sweep occurs in the local oscillator 75 by this varying and the level of the sweep range is governed along line 81 from the initial sweep center control voltage 80 coming into the electronic tuning unit 106 to control local oscillator 75. In the presence of the target that sweep is stopped as explained hereinbelow.

The presence of a target will first cause the sweep to slow down as the negative voltage in the output of search unit phase detector 43 builds up. The build-up of the negative voltage is accompanied by reduced positive portions and since it was the positive portion that caused the sweep to advance, its reduction causes slowing down of the sweep. In the preferred embodiment, the sweep voltage is not a conventional sawtooth but consists only of these rectified and integrated positive pulses from the phase detector. They approximate a sawtooth in the absence of a signal, but have the additional feature of being able to slow down the sweep if the signal appears to be present. In the presence of a target the sweep slows down sufficiently for lock to occur and the locking takes place by means of a phase-locked automatic frequency control loop which can be traced from the 25 kc. narrow-band amplifier 23 in Doppler gate amplifier No. 1 along line 82 to the variable local oscillator unit automatic frequency control. The detailed structure of this automatic frequency control can be seen in the schematic of FIG. 3F. There is a phase detector contained in this automatic frequency control unit which essentially detects the phase difference between the 25 kc. signal and a 25 kc. signal which is obtained from a fixed oscillator shown in FIG. 2, and which does appear in the schematic of the unit. That is the way lock-on occurs in the presence of a target.

The following section will deal with the retrace circuits and the delayed flip-flop:

The purpose of the retrace circuit is twofold, one is to cause the sweep to recycle when it has reached the end of its range and the other is known as a kickback feature. This, rather than causing the sweep to start searching from some arbitrary position if the target signal is lost, causes the sweep to start a search in the position that the target signal was last present to maximize the probability of relocking in a very short time. For example, if a target signal happens to be present at a frequency of 12 kc. and this signal disappears the sweep would kickback about 2 kc. to about 10 kc. and then sweep through 12 kc. as it begins sweeping again. In other words, if the target is lost momentarily the sweep continues at about the same frequency for awhile so that when the target again appears it is rapidly picked up. More detail will be given as to the sequence of events from locking-on to loss of target to relock. First, when a target appears to be present, the sweep will pause and if the target is actually present the variable local oscillator will become phase-locked and this will cause the sweep to be stopped completely. Now, if the target signal disappears for any reason such as fading for example, there will be a slight hesitation, approximately one-half second, before resweep occurs, that is, the local oscillator 75 is held to the frequency at which the target signal was last seen. This delay is introduced so that if the target then appears it will remain locked. If the target signal reappears within a half second it will relock immediately. If, however, the target signal remains absent for more than a half second, resweeping a new search cycle begins, which resweeping is initiated with a kickback of about 2 kc. so that the resweep first covers the vicinity of the last received target frequency.

The interrupter, delayed flip-flop and phase detector action in the search unit will now be described.

The action of the delayed flip-flop 120 in the search unit is twofold; it controls the interrupter relay 41 and opens it approximately one-half second after a signal has disappeared. At the same time as it opens the interrupter relay 41, it reinstitutes the search feature through the retrace circuits of the search unit. That is, it simultaneously feeds a signal to the rectifier 44 and search unit retrace circuits 46 to once again cause the integrator 45 to be actuated to produce a signal at junction point 81 such that the sweep will continue again in the local oscillator 75 in the variable local oscillator unit. The signal continues through the interrupter 41 during the one-half second waiting period, that is, the signal is passed until the instant that resweep is instituted. As soon as resweep begins, that is, one-half second after the signal has disappeared, the interrupter relay 41 opens to prevent spurious information from passing on as a command signal. During that one-half second continuous signals can pass through the closed interrupter relay to eventually actuate the control surfaces of the missile through the command signal channel. These signals come through whenever we have a locked-on condition on a target and they actuate the control surfaces of the missile. Because of periods of short signal amplitude fades in which the signal quality becomes quite poor for short lengths of time, the one-half second delay is provided in opening the interrupter 41, so that the interrupter does not open every time a signal fade occurs. The control surfaces are therefore in the same position if for a very small interval of time, less than half a second, the target for some reason or other faded away. However, there might be some noise superimposed upon the control signal for this short period causing a very minor maneuver of the missile. In the presence of target signals with the interrupter relay 41 closed allowing signals to pass, the discriminator 40 output is filtered or integrated in a conventional RC network 31 having a time constant of about .2 second. This is in the measurement unit 25 producing the command signal output. This filtered output from the discriminator 40 is used to modulate a 2 kc. carrier in a balanced modulator 42 thus producing a suppressed carrier waveform which is amplified and sent to the control surfaces through hydraulic servo units (not shown). The balanced modulator 42 and the following amplifier 49 are merely to give us a signal of the character necessary to actuate the servo mechanisms and control the command signal circuitry.

Referring more particularly to FIG. 2 of the drawings there is shown in detail a block diagram of the Doppler gate section of the CW seeker.

The Doppler signal which is amplified in the wideband Doppler amplifier 17 which follows the Doppler converter 15 in FIG. 1 is mixed with the variable local oscillator 75 output to a frequency of 500 kc. The details of FIG. 2 are intended to show the action of the automatic frequency control loop which controls the variable local oscillator 75 when a signal is present. The signal from the mixer 110 of 500 kc. is amplified and again mixed with the output of oscillator 115 in channel 1 to 25 kc. It should be noted that channel 1 differs from channel 2 in that it is the frequency controlling channel, that is, the frequency of the variable local oscillator 75 is controlled by the signal in channel 1 only. A phase detector 47 and 25 kc. reference oscillator 95 are incorporated in the frequency control phase-lock loop. The signal from the 25 kc. amplifier 23 of channel 1 is compared in this phase detector 47 with the signal from the 25 kc. fixed reference oscillator 95. The phase difference is integrated and applied to a resistance or reactance tube which controls the frequency of the variable local oscillator 75. Since this is a phase-locked loop, when the loop is locked there can be no frequency error or frequency difference between the signal frequency in the 25 kc. amplifier 23 and the frequency of the 25 kc. reference oscillator 95. The loop response to frequency modulation of the variable local oscillator control loop is approximately 100 cycles and is a determining factor in the bandwidth of the Doppler gate amplifiers. In other words, frequency variations at rates up to 100 c.p.s. of the signal can be followed by the local oscillator loop. Frequency variations at higher rates than 100 cycles can be caused by system noise of various types, one example of which is the illuminating transmitter FM by noise or by power supply ripple in the mother plane, in a semiactive system. The signal following the 500 kc. wide-band amplifier 18 in channel 1 is again mixed with 475 kc. from fixed oscillator unit 115 to a frequency of 25 kc. The signal at 25 kc. is used both as one of the measurement channel signals and as a controlling signal for the phase-lock variable local oscillator loop. It goes both to a phase detector 47 in the variable local oscillator control loop and to a 25 kc. narrow-band amplifier stage 23 in the No. 1 measurement channel. The bandwidth of the stage is 200 c.p.s. and 25 kc. is the center frequency. The 25 kc. signal from the channel 1 is compared in the phase detector 47 with a 25 kc. reference signal and a signal generated proportional to the phase difference between these two which will be DC if the signal in the 25 kc. channel is exactly correct. This DC is integrated and applied to a reactance or resistance tube which tunes the oscillator 75. If the 25 kc. amplifier signal is not actually 25 kc. but on comparison there is a phase difference between that signal and the 25 kc. signal from the reference oscillator 95, that is, if the signal in channel 1 is not exactly 25 kc. there will be a low frequency sinusoidal output from the phase detector 47. This output, if the signal frequency in channel 1 is sufficiently close to 25 kc., will be a low frequency output capable of pulling the local oscillator 75 until it snaps in or locks to the correct frequency such that the signal in channel 1 is exactly 25 kc. as determined by the 25 kc. reference oscillator. In any case there will be 2 kc. difference between channel 1 and channel 2. The channel 1 signal may be slightly off 25 kc. in which case channel 2 will be slightly off 23 kc. The 10.2 kmc.p.s. filter of FIG. 1A comprises simply a section of circular waveguide beyond cutoff which furnishes attenuation to signals below the 10.2 kmc. frequency. The mixer is a simple balanced crystal detector. Referring more particularly to FIGS. 3A through 3K, the IF preamplifier shown in schematic in FIG. 3A comprises conventional amplifier circuitry. FIG. 3B is a schematic representation of the 60 mc.p.s. measurement IF circuit and the Doppler converter circuitry. Inasmuch as the structure and operation of this circuitry will be familiar to one skilled in the art from the drawings and the table of values set forth hereinbelow, no description of that schematic diagram is given here.

The complete circuitry of the Doppler gate amplifier 1 comprising the Doppler amplifier mixer, the 500 kc.p.s. amplifier, an additional mixer, a 25 kc.p.s. narrow-band amplifier and automatic gain control (AGC) circuitry is shown in FIG. 3C and inasmuch as the structure and operation of this circuitry will be familiar to one skilled in the art from the drawings and table of illustration values set forth hereinbelow, no detailed description is given.

FIG. 3D is a schematic representation of the klystron automatic frequency control (AFC) circuit and power supply.

The channel 2 circuitry similar to channel 1 is not shown by way of separate schematic illustration because of the fact that it is substantially identical to the circuitry of channel 1 shown. The particular circuit of the mixer 111 is also not shown inasmuch as it is identical to the circuitry of the corresponding mixer in channel 1.

Referring to FIG. 3E there is shown in schematic diagram form the reference IF amplifier 104 and associated automatic gain control circuitry 103. In addition, a 60 mc. discriminator employed in the AFC loop 105 is shown on this schematic.

FIG. 3F shows the variable local oscillator unit. The variable oscillator is shown at the bottom of FIG. 3F1. In addition, FIG. 3F2 shows the 25 kc. reference oscillator 95 employed in AFC circuit 106 not shown in the block diagram of FIG. 1. In addition, FIG. 3F shows the 25 kc. phase detector which is also a part of AFC loop 106. Also, on this schematic are shown the two balanced mixers 110 and 111 used in channels 1 and 2.

FIG. 3G shows schematically the various units comprising the fixed local oscillator unit in particular the 2 kc. reference oscillator with its associated tuning control, the 475 kc. fixed oscillator, a 2 kc. phase detector, a mixer, a 477 kc. variable oscillator with its associated tuning control and the conventional RC low pass filter integrator circuit. The circuitry is designed to get two oscillators at about 500 kc. to be phase-locked with a separation of 2 kc. Therefore, in FIG. 3G referring to the circuitry shown in stage V6G, this circuitry ensures that that will take place. This is done as follows: When the power is initially turned on, one oscillator (475 kc.) is several kilocycles separate from the other (477 kc.). These two oscillators at 475 kc. and 477 kc. are the ones labeled in FIG. 1 as 115 and 116 respectively. The 475 kc. oscillator remains at a fixed frequency at all times. When the power is first turned on however, the 477 kc. oscillator is somewhat higher than 477 kc. and an initial single sweep takes place in which the oscillator drifts quickly down to 477 kc. When it reaches that point it automatically locks in. This is effected by the circuitry shown in stages V6G and V7G of FIG. 3G, V7G being the 477 kc.p.s. oscillator which is a Clapp oscillator. The oscillator frequency is changed by means of a reactance tube V7G comprising a cathode follower. Changing the bias on the grid of the cathode follower V7GB changes the gain slightly. This causes a change in the effective capacity between cathode of V7GA and ground which causes a change in oscillator frequency. When the power is initially turned on a negative voltage immediately appears across R45G from the minus 150 volt supply. Since the charge on the one-half microfarad condenser C19G attached to it cannot change instantaneously, this voltage is transmitted to the grid of tube V7GB. With time, the condenser C19G is able to charge and in so doing the voltage on the grid of V7GB goes to its normal operating position. Therefore, during the charging of the condenser C19G, the voltage on the grid of V7GB was changing continuously causing the frequency of the oscillator to change continuously. This is the way the sweep is produced, the oscillator is swept downward toward 477 kc. in this fashion during the 0.5 mf. capacitor C19G charge up time. If it were not for the locking-in ability of the loop, the oscillator would continue to pass through 477 kc. However, the loop locks in the instant the oscillator passes through 477 kc. and keeps it at that frequency. The action of the 0.5 mf. capacitor C19G which charges up slowly gives a unique effect similar to that, for example, which an impressed sawtooth voltage might have on the grid of the stage V7GB. This charging up allows sweep between limits over several kilocycles. This is enough of a range to guarantee that during that single sweep it will pass through its proper operating frequency and lock in. The lock-in is accomplished as follows: Suppose the 0.5 mf. capacitor C19G in the grid circuit of V7GB has charged and the 477 kc. frequency is reached, the voltage on the grid of the reactance tube is maintained constant by the action of the phase detector loop which has been described hereinabove. Before the oscillator locked in the loop, the phase detector could only put out AC, it had no controlling voltage on the grid of V7G, so that the only DC voltage across that 0.5 mf. condenser C19G was that due to this charging-up process as has been described. But at the instant the loop locks, an error voltage appears at the output of the phase detector which maintains the voltage from then on.

Explaining the lock-on feature again, on sweeping through a frequency which must pass through 477 kc., once that frequency is reached lock-on occurs at 477 kc. One oscillator is fixed at 475 kc.; it has no reactance tube and does not change frequency. Its frequency is compared in the mixer with the 477 kc. oscillator and the difference frequency is 2 kc. only when the 477 kc. oscillator is at its proper frequency. The output frequency of the mixer is compared with the 2 kc. reference oscillator in phase detector 117. When the frequency out of the mixer is 2 kc., the same as that of the 2 kc. reference oscillator, a DC voltage appears out of the phase detector 117 of the proper polarity to cause a change in frequency of the 477 kc. oscillator to keep it locked in. The integrating circuit consists essentially of the 0.5 mf. condenser C19G and the parallel combination of R31G and R32G. The 20K ohm resistor R45G is simply for the initial sweep. Condenser C19G in conjunction with the two 1.0 megohm resistors R31G and R32G form an integrator. When used in that fashion it is a conventional integrator circuit. That ensures that the proper voltage will be maintained at the grid of tube V7GB such that there will continue to be 477 kc. output or in any case 2 kc. difference from the output of the fixed oscillator.

FIG. 3H shows the measurement unit, the mixer V1H being a conventional 5829 tube and the 2 kc.p.s locked oscillator shown generally as tube V2H, a 6111 tube in a conventional oscillator connection shown by the various resistors and inductances in the circuit.

The box shown in dashed lines in the right-hand section of FIG. 3H presents the discriminator circuit and the input to the interrupter relay unit 41 on lines K7 and K6. Line K6 is the output of the discriminator 40 to the interrupter relay 41 which is not shown on this schematic. Line K7 is the input to this unit from the interrupter relay 41 and it, in turn, goes through the low-pass filter 31 to K5, the final output from this unit. The phase detector 43 in the search unit is shown in the lower central portion of FIG. 3H and will be described later in conjunction with the detailed description of the search unit.

Referring more particularly to FIG. 3K wherein there is shown essentially the Doppler search unit 130 in the block diagram of FIG. 1; in the absence of a target action in the circuit takes place as follows:

In the absence of a target the output of the phase detector block 43 is random noise with no DC component. This random noise is applied to the grid of V8KA which is a cathode follower and then applied to the second half of V6K which rectifies it and the positive half of this rectified noise appears at the cathode of stage V6KB. These positive pulses are then applied through the on-target relay (not shown). After going through the on-target relay these positive pulses are applied to the point labeled A which is attached to the 1 mf. condenser C11K at the grid of V11K through a 2 megohm resistor (not shown). It causes the 1 mf. condenser C11K to charge up positive. With the negatives of the noise signal coming from the phase detector, no voltage appears at the cathode of V6KB therefore the charging process of the 1 mf. condenser C11K is temporarily suspended and continues on the next positive pulse. Stage V6K is the rectifier. Stage V11K really follows the integrator capacitor C11K and is simply an amplifier whose output, in turn, is going to 81 shown on the block diagram in FIG. 1A. That is, it goes to the reactance tube which changes the frequency of the local oscillator 75 so that as the 1 mf. condenser C11K charges up in random steps, the frequency of the local oscillator 75 changes accordingly. This occurs in the absence of a target. Now eventually the voltage on the 1 mf. condenser C11K which is applied by means of the cathode follower V11KB to the grid of V8KB causes the voltage on the grid of V4KA to reach a critical level at which V4K, which is a flip-flop circuit, fires. The circuit of tube V4K is thus a delayed flip-flop circuit. Still describing operation in the absence of a signal, when V4K flips, a small portion of the pulse, which is produced at its plate, is applied from the plate of V4KA to the grid of V7KB at C. This section of the tube V7K during the previous period had been non-conducting and is momentarily caused to conduct by the application of this now positive pulse. The cathode of V7KB is maintained at a somewhat negative voltage due to the action of the voltage divider of the 24K, 5.1K, and the 120K resistors, R12K, R13K and R15K, between the minus 150 volts and ground. As stated, the cathode is maintained slightly negative during cutoff, the grid is maintained even more negative. With the application of the positive pulse, which is the small signal from C, that is, the positive pulse due to the flipping of V4K, V7KB momentarily conducts causing a negative voltage to be applied to point A. This negative voltage is caused by conduction through tube V7KB and the 20K resistor R54K. Thence that negative pulse caused by the conduction of the tube and change in resistance of it, therefore changing the potential between its plate and its negatively held cathode, that negative voltage is applied to point A through the 20K ohm resistor R54K and hence, the voltage on the 1.0 mf. condenser C11K in the grid circuit of tube V11KA suddenly goes negative producing flyback. When capacitor C11K goes negative, this negative voltage is transferred by means of the cathode follower V11KB and by means of the second cathode follower V8KB through a delay consisting of the 1 megohm resistor R39K and the .25 mf. condenser C3K to the grid of V4K causing the flip-flop to go back to the condition it was in before the flyback occurred and the cycle starts over again. That is the way the sweep is accomplished in the absence of signals. The coupling between the second half of V11K and in the second half of V8K is through a 1 mf. condenser C12K in series with a 100K resistor R11K in the cathode circuit of tube V11KB. This means that the sawtooth which has been produced is essentially AC coupled. This permits changing the DC voltage across 1 mf. condenser C12K thereby shifting the absolute limits of frequency which the sawtooth represents. The sawtooth was generated by means of charging up capacitor C11K on the grid of the first half of V11K and a critical voltage was reached at the flip-flop. This is in the absence of the target signal. This caused the flip-flop V4K to fire, discharging the condenser and starting the cycle over again. And then the action in tube V11K causes the sawtooth action. The voltage at the cathode circuit of tube V11KB which is removed between the 6200 ohm resistor R55K and the 9100 ohm resistor R56K goes to the reactance tube to control the frequency of the oscillator 75 so that the reactance tube which controls local oscillator 75 is caused to sweep over the range of frequencies generated in this local oscillator 75 in the absence of a target.

The 1 mf. condenser C12K, which couples the second half of tube V11K with the second half of V8K, has a DC voltage on it and couples an AC voltage which is the sawtooth and the amount of this DC voltage depends upon where the sawtooth will appear in the overall band. The DC is blocked at C12K. This DC would eventually leak off, however, there is a fairly large time constant in this case which involves the 10 megohm resistor R8K and the 1 mf. capacitor C12K. Sufficient time constant exists such that too much of the DC is not lost and the sweep is essentially between the same two limits until a target has been picked up. This being repetitive, the 10 megohm resistor R8K plus the 1 mf. capacitor C12K holds it for the full length of the sweep so that at the time the cycle is repeated the hold is not lost. While tracking the target, the voltage on his 1 mf. condenser C12K is continuously changing in accordance with the change in Doppler frequency being received from the target. That is in the presence of a target signal the junction of R8K and C12K is clamped by means of V3K to a fixed voltage. When this target signal is lost, the 1 mf. condenser C12K has a voltage on it corresponding to the last Doppler location, therefore, when the sweep resumes, it will no longer be about the original sweep value but about the new one which is determined by the last frequency which was picked up because of the target. In other words, the target is again picked up rapidly because there is not a delay for the whole sweep but merely a sweep over a section from which the target is remembered in this memory retention feature.

Now considering the condition when a target is initially received, in this case instead of obtaining random noise out of the phase detector 43 which is across the oscillator, there is obtained a sudden negative voltage. This negative voltage, which appears at the output of phase detector 43 in the presence of a target, is applied at point H5 in FIG. 3K. When the signal initially occurs, this sudden negative voltage is transmitted through capacitor C8K at the H5 input to the cathode follower V8K and through the 1.0 mf. condenser C80K in the cathode circuit of V8K to the plate of the rectifier V6KB. Capacitor C80K provides capacitor coupling. This causes the rectifier plate of the V6KB to go negative and therefore no voltage appears at the output of the rectifier at the cathode. There is no current flow through the 3.9 megohm resistor R6K. Since the production of sweep depends on the existence of a positive voltage on the cathode of the rectifier tube V6KB, the sweep is now stopped. The relay is not energized and is still in its initial condition but the sweep is stopped. The relay does not open and close during the sweep, the relay during sweep is on the off-target position of the two positions of the relay i.e., the points labeled "out to relay" and "in from relay" are connected. No sweep is now present because no voltage is being applied to the relay contacts and hence no voltage appears at the 2 megohm resistor R7K to charge up the 1 mf. condenser C11K at the grid of tube V11K. However, if the plate circuit of the rectifier V6KB suddenly goes negative, the voltage at the cathode goes to zero. Therefore, no charging voltage exists for the 1 mf. condenser C11K. It, therefore, retains whatever charge it has for the moment, but does not advance so that sweep is momentarily stopped. This permits the electronic tuning AFC loop to lock on to the target. Since the sweep is stopped this prevents requiring the AFC loop to fight against a sweep which is trying to pull the local oscillator 75 off the signal. The sweep for the moment does not exist. Now it is possible that this was not a signal after all but merely some pulse noise which resembled the signal. Should this pulse or whatever it is (applied at H5) disappear before half a second has elapsed, then we would once more have the no signal condition, noise would be coming out of the phase detector which would be rectified and it would advance the sweep. Therefore, if a very brief signal or something resembling a signal disappears before the half second has elapsed, the sweep would resume just as if the signal had not been obtained at all. But if the signal stays there for half a second it causes the 0.5 mf. condenser C81K which is in series with the 1 megohm resistor R80K on input H5 whose output is at the point labeled E, it will cause the voltage on that point E to reach a certain level. The 0.5 capacitor C81K is charging and it will charge up negatively in the presence of an actual target signal. When the signal is present for a full half second the voltage at point E reaches such a level that it causes flip-flop V5K to fire. In firing, negative voltage is applied to the grid of V5A through the 1 megohm resistance coupling resistor R5K which causes the first half of that stage to be cut off. The stage V5K is the delayed flip-flop circuit which fires after a half second has elapsed. That is, V5K is the delayed flip-flop circuit 120 in the search unit in FIG. 1. After this half second signal has elapsed and the delayed flip-flop V5K has flipped over there is a target condition present. In this case, the "in from" and "out to" relay which passes through its contacts the voltage from the rectified noise to cause the sweep now opens its contacts thereby removing all possibility of further sweep voltage being applied.

Once the flip-flop V5K has gone over to target condition a momentary disappearance of signal will no longer cause the sweep to start immediately, the reason for this is the relay contacts are open so that even if random noise should for a moment appear at the output of the phase detector 43 and this noise is rectified and positives appear at the output of the rectifier 44, these positives are not transmitted through the 2 megohm resistor R7K to charge up the 1 mf. condenser C11K. With the relay contacts open there is no path to condenser C11K from tube V6KB. However, should the signal disappear and stay off for more than half a second, this causes the voltage in the 0.5 mf. condenser C81K, connected to point E and in series with the 1 megohm resistor R80K to H5, to go back to the voltage level it had before the target signal had been obtained. In that case flip-flop V5K returns to its initial stage which is in on-target condition. The flip-flop V5K has two stable states; it is direct coupled in the sense you do not hit it with a pulse through a condenser and make it go into one state or another, but you actually put a voltage on the grid and when the voltage on the grid reaches a certain level, it flips in one direction. When it drops below that level to a slightly different level, it goes in the other direction. This is a conventional circuit of the type described in the book "Time Bases" by Puckle.

In going back to its initial off-target condition, the flip-flop V5K causes the relay contacts once more to close permitting the sweep voltage to resume. In other words, it flipped over because the negative voltage now applied to point E has been suddenly removed so that now current flow can occur in the cathode through the tube V5KA. On current flow being applied through that tube the cathode of V5KB goes more positive causing V5KB to be cut off whereas it previously was conducting. Very fast regenerative action occurs. This tube is now in its original condition wherein the relay has now closed its contacts. The current flows through point H7 through the relay unit and the increased current flow causes that relay to close its contacts. These relay contacts being closed there is now transmission from the "out to" relay point to the "in from" relay point and eventually the signals arrive through point A where they are picked up at the grid of stage V11KA to once again charge up the 1.0 capacitor C11K.

While the signal was present and the Doppler frequency was changing, the voltage across the 1 mf. condenser C11K at the input of V11K was continuously being adjusted by the electronic tuning. The way the voltage across the 1 mf. condenser at the point A varies in order to produce the sweep has been described. The voltage across capacitor C11K, when signal is present, varies in accordance with the Doppler frequency of the signal in order to track the Doppler and this is accomplished from the connector H3 whence comes the correction voltage on the AFC loop circuitry and this voltage is applied through the 18 megohm resistor R110K. That AFC loop and detector circuitry shown in FIG. 1 and in block 106, is the electronic tuning. The electronic tuning consists of a 25 kc. reference oscillator having an output applied to a phase detector into which is also applied the signal from the 25 kc. IF and the voltage produced from that phase detector is applied to connector H3 to control the voltage on the 1 mf. condenser C11K. This is due to the Doppler effect of the relative movement between target and missile. In the absence of signal the voltage coming into point H3 of FIG. 3K is just random noise and that causes no change in the average voltage across the 1 mf. condenser C11K. However, if the target is changing its position relative to the missile, then we get a signal in through H3 which is a function of the Doppler frequency. The AFC loop follows the Doppler frequency which changes with the relative velocity between target and missile.

Continuing with the description of FIG. 3K, V3K is a switch tube whose purpose is to prevent changes in voltage from appearing on the grid of V8KB when the target signal is present and to maintain and prevent that side of the 1 mf. condenser C12K, which is attached to the grid of V8KB, from changing in voltage. This permits the charge on capacitor C12K to change in accordance with the frequency of the local oscillator at that moment. In the presence of a signal, if we have achieved the on-target condition at which flip-flop V5K has been fired, the switch tube V3K has been fired also by flip-flop V5K. This causes the end of the 1 mf. condenser C12K, which is on the grid of tube V8KB, to be at a fixed potential. As the Doppler frequency changes, the voltage on the 1 mf. condenser C11K attached to point A changes accordingly to cause tracking by tube V11KA. Since tube V11K is an amplifier, this voltage change, as amplified, appears on the cathode of tube V11KB and goes to the reactance tube in electronic tuning AFC 106. At the same time, this voltage is applied through the 100K resistor R11K to the capacitor C12K while the switch tube holds one end of capacitor C12K at a fixed potential. Therefore, the voltage on this 1 mf. capacitor C12K changes in accordance with the momentary Doppler frequency. When the target signal is lost after the one-half second delay has occurred and flip-flop V5K has gone back to the off-target condition, it releases switch tube V3K causing release of the side of the 1 mf. condenser V12K attached to the grid of V8K which had been kept at a fixed potential and this permits changes occurring at the output of V11K to be transmitted through that 1 mf. capacitor C12K to the grid of V8KB, and therefore causes a sweep to occur about this new center determined by the last Doppler. The sweep deviation α (alpha) control, controls the amount of sweep between center and maximum frequency. The β (beta) control controls the size of the flyback. We have seen how tube V7K causes a flyback to occur by obtaining a narrow pulse from flip-flop V4K and applying it to the grid of V7K, thus causing a negative voltage to be applied suddenly to the capacitor C11K, connected at point A. When the entire signal is lost, it is desirable to kick the sweep back slightly and sweep through the position which was last occupied, instead of starting at one end of the sweep. This speeds up reacquiring the signal because the probability is that the signal is pretty close to the position it last occupied; it may go either at a slightly higher frequency than it was or slightly lower. That is the memory feature. This slight kickback is produced in a manner very similar to the flyback which has been described. The only difference is that a narrow pulse is applied to the grid of V7KB causing V7KB to conduct thus producing a negative voltage on the capacitor C11K attached to point A. Instead of the pulse being produced from flip-flop V4K, it is produced from flip-flop V5K from the plate of tube V5KB which goes in the positive direction only when tube V5K flips from an on-target condition to an off-target condition. This pulse is produced by differentiating in the 400 mmf. condenser C7K, which is on the grid of tube V7KB. A positive step occurs in the plate of tube V5KB when tube V5K goes to an off-target condition. As indicated, this step is differentiated by means of 400 mmf. capacitor C7K (in connection with the resistance) which produces a narrow pulse. The actual differentiating resistance is essentially resistor R26K. The positive impulse on the grid of tube V7KB causes tube V7KB to conduct, not for as long as it does during the regular flyback of the sweep, but for a very small fraction of that flyback; this causes a little notch to occur before the sweep resumes in its normal fashion. The voltage across the 1.0 mf. condenser C11K, connected to point A, is an exact measure of the frequency which the local oscillator 75 has at any moment, so that, whatever is done to the voltage across condenser C11K, is really done to the frequency of the local oscillator 75. To set the sweep initially, the external controls, which are on the connectors H1 and H2, apply a voltage to the grids of the halves of the switch tube V3K corresponding to the voltage that these grids would normally get in an on-target condition. This causes the switch tube V3K to conduct and maintains the voltage, on that side of capacitor C12K attached to the grid of V8K, at a constant potential as was described previously during a target condition. The voltage across capacitor C11K, which is attached to point A, is now adjusted by means of a low impedance voltage source which is attached to point A through connector H2 to apply a voltage corresponding to the frequency which is desired as a sweep center. When the missile is released, the voltage across the capacitor C12K, or more exactly, the voltages across both 1.0 mf. condensers C12K and C11K is at the proper level, thus causing the sweep to occur about the desired frequency. There are two local oscillators involved, a 475 kc. and a 477 kc. oscillator separated 2 kilocycles apart. The local oscillator for the electronic tuning is at a higher frequency in the range of about 520 kc. to about 580 kc. Thus, there is a 60 kilocycle spread. The entire Doppler band in which we are interested might be 60 or 70 kilocycles wide, however, generally it is desirable to sweep over perhaps one third of that with advance information as to the speed of the target which is to be tracked. That is, a fairly good idea of the range in which the Doppler lies is known and, to save time, the sweep is made only over a portion of the Doppler band. By means of H2 and H1 controls, the center of the sweep can be set into any position desired in that band. The size of the sweep and the value of the α and β deviation of the sweep are controlled right in the unit (see potentiometers P3K and P1K). Although these potentiometers could be varied, once the apparatus has been assembled, they probably would not be varied, however, connectors H1 and H2 are brought out externally to permit setting the sweep before launch depending on the speed of the target expected to be tracked. Therefore, against a high speed missile, the sweep would be set for one spread and for a fairly slow flying target, a smaller spread would be used.

Although in nowise to be construed as limiting the scope of the present invention tables of suggested values and identifications of the components illustrated on the schematic figures are set forth hereinbelow:

TABLES OF SUGGESTED VALUES OF ILLUSTRATIVE EMBODIMENT

Table I, FIG. 3A—General notes—Unless otherwise stated (1) All capacitors of .001 mf. are rated 200 v. DC.
(2) All resistors rated ½ w.
(3) All coils close wound with #32 wire.

| Part: | | Value |
|---|---|---|
| C1A | mmf | 10 |
| C2A | mf | .001 |
| C3A | mf | .001 |
| C4A | mf | .001 |
| C5A | mf | .001 |
| C6A | mmf | 500 |
| C7A | mf | .001 |
| C8A | mf | .001 |
| C9A | mf | .001 |
| C10A | mf | .001 |
| C11A | mf | .001 |
| C12A | mf | 1 |
| C13A | mf | .001 |
| C14A | mf | .001 |
| C15A | mf | .001 |
| C16A | mf | .001 |
| C17A | mf | .001 |
| C18A | mf | .001 |
| L1 | | Coil |
| L2 | | Coil |
| L3 | | Coil |
| L1A | mh | 1.2 |
| L2A | mh | 1.2 |
| L3A | mh | 3 |
| L4A | mh | 3 |
| L5A | mh | 3 |

Table I—Continued

| Part: | | Value |
|---|---|---|
| L6A | mh | .25 |
| L7A | mh | .25 |
| L8A | mh | .25 |
| L9A | mh | .25 |
| R1A | ohms | 240K |
| R2A | do | 220 |
| R3A | do | 510K |
| R4A | do | 8.2K |
| R5A | do | 1.5K |
| R6A | do | 150K |
| R7A | do | 43 |
| R8A | do | 2.7K |
| R9A | do | 470 |
| Tube: | | Type |
| V1A | | 6111 |
| V2A | | 5702 |

Table II, FIG. 3B—General notes—Unless otherwise stated (1) All capacitors of .001 mf. are rated 200 v. DC.
(2) All coils close wound with #32 wire.

| Part: | | Value |
|---|---|---|
| C1B | mmf | 500 |
| C2B | mf | .001 |
| C3B | mf | .1 |
| C4B | mf | .001 |
| C5B | mf | .001 |
| C6B | mf | .001 |
| C7B | mf | .001 |
| C8B | mf | .001 |
| C9B | mf | .1 |
| C10B | mf | .001 |
| C11B | mf | .001 |
| C12B | mf | .001 |
| C13B | mf | .001 |
| C14B | mf | .001 |
| C15B | mf | .001 |
| C16B | mf | .001 |
| C17B | mf | .001 |
| C18B | mf | .001 |
| C19B | mmf | 1–12 |
| C20B | mf | .001 |
| C23B | mf | .001 |
| C24B | mf | .001 |
| C25B | mf | 10 |
| C26B | mf | .001 |
| C27B | mf | .001 |
| C28B | mf | .001 |
| C30B | mmf | 1–12 |
| C31B | mmf | 1–12 |
| L4B | mc | 61.6 |
| L5B | mc | 58.4 |
| L6B | mh | 3 |
| L7B | mh | 3 |
| L8B | mh | 3 |
| L9B | mh | 3 |
| L10B | mh | 3 |
| L11B | | tuned |
| Tube: | | Type |
| V1B | | 5702 |
| V2B | | 5702 |
| V3B | | 6BF7 |
| V4B | | 5896 |
| V5B | | 5718 |

| Part: | | Value |
|---|---|---|
| R1B | ohms | 51 |
| R2B | do | 12K |
| R3B | do | 43 |
| R4B | do | 150K |
| R5B | do | 5.6K |
| R6B | do | 470 |
| R7B | do | 150K |
| R8B | do | 150K |
| R9B | do | 4.3 |
| R10B | ohms | 120K |
| R11B | do | 1.0M |
| R12B | do | 220K |
| R13B | do | 1.5K |
| R14B | do | 9.1K |
| R15B | do | 9.1K |
| R16B | do | 680 |
| R17B | do | 51K |
| R18B | do | 100K |
| R19B | do | 22K |
| R20B | do | 470 |
| R21B | do | 470 |
| R22B | do | 47 |
| T1B | | Toroid |

Table III, FIG. 3C—General Notes—Unless otherwise stated (1) L1C=3 mh. Toroid Freed 1784T.
(2) L2C=15 mh. Toroid Freed 1788T.
(3) L3C and L4C=1 mh. Toroid Freed 1782T.
(4) Capacitance values shown across these inductances are for 25 kc.p.s. channel only.

| Part: | | Value |
|---|---|---|
| C1C | mf | .5 |
| C2C | mmf | 10 |
| C3C | mf | .25 |
| C4C | mf | .25 |
| C5C | mf | .01 |
| C6C | mmf | 300 |
| C7C | mmf | 450 |
| C8C | mf | .014 |
| C9C | mf | .001 |
| C10C | mf | .1 |
| C11C | mf | .001 |
| C12C | mf | .25 |
| C13C | mf | .1 |
| C14C | mmf | 2700 |
| C15C | mf | .001 |
| C17C | mf | .0405 |
| C18C | mf | .5 |
| C19C | mf | .25 |
| C20C | mf | .0405 |
| C21C | mf | .01 |
| C22C | mmf | 300 |
| C23C | mf | .001 |
| C24C | mf | .001 |
| C25C | mf | .25 |
| C26C | mf | .25 |
| C27C | mf | .001 |
| C28C | mf | .001 |
| C29C | mf | .001 |
| C30C | mf | .01 |
| T–1 | Freed | 1:10 |
| L5C | mh. cup core | 1 |
| L6C | mh. cup core | .35 |
| L7C | mh. cup core | .25 |
| R1C | ohms | 500K |
| R2C | do | 1K |
| R3C | do | 5K |
| R4C | do | 140K |
| R5C | do | 100K |
| R6C | do | 1M |
| R7C | do | 2K |
| R8C | do | 10K |
| R9C | do | 300K |
| R10C | do | 1K |
| R11C | do | 1M |
| R12C | do | 1K |
| R13C | do | 1M |
| R14C | do | 500K |
| R15C | do | 160K |
| R16C | do | 1K |
| R17C | do | 1K |
| R18C | do | 240K |

Table III—Continued

| Part: | | Value |
|---|---|---|
| R19C | ohms | 180 |
| R20C | do | 1.2M |
| R21C | do | 2700 |
| R22C | do | 100K |
| R23C | do | 510K |
| R24C | do | 1M |
| R25C | do | 1K |
| R26C | do | 100K |
| R27C | do | 1.2K |
| R28C | do | 1M |
| R29C | do | 910 |
| R30C | do | 20K |
| R31C | do | 150K |
| R32C | do | 250K |

| Tube: | Type |
|---|---|
| V1C | 6112 |
| V2C | 5840 |
| V3C | 5784 |
| V4C | 5840 |
| V5C | 5840 |
| V6C | 6112 |
| V7C | 6111 |

Table IV, FIG. 3D—General Notes (1) T–1D Transformer Data: Newton Engineering Order No. DIC F–201 Nov. 1952—Core Hypersid Westinghouse No. H 363.

| Part: | Value |
|---|---|
| C1D | .05 mf. 600 v. |
| C2D | .01 mf. 200 v. |
| C3D | 0.1 mf. 400 v. |
| C4D | 0.1 mf. 400 v. |
| C5D | 100 mmf. |

| Tube: | Type |
|---|---|
| V1D | 5902 |
| V2D | 5902 |
| V3D | 5702 |
| V4D | 5783 |
| V5D | 5840 |
| V6D | 6110 |

| Part: | | Value |
|---|---|---|
| R1D | ohms | 91K |
| R2D | do | 220K |
| R3D | do | 100K |
| R4D | do | 2.2K |
| R5D | do | 100 |
| R6D | do | 2.2K |
| R7D | do | 100 |
| R8D | do | 100K |
| R9D | do | 120K |
| R10D | do | 33K |
| R11D | do | 100K |
| R12D | megohms | 2 |
| R13D | ohms | 47K |
| R14D | do | 100K |
| R15D | do | 750 |
| R18D | do | 470 |
| R20D | do | 220K |
| B1D | v | 600 |
| P1D | ohms | 100K |
| P2D | megohms | 2 |

Table V, FIG. 3E—General notes (1) All capacitors of .001 mf. are rated 200 v.
(2) All coils close wound with #32 wire.

| Part: | | Value |
|---|---|---|
| C1E | mmf | 500 |
| C2E | mf | .001 |
| C3E | mf | .001 |
| C4E | mf | .001 |
| C5E | mf | .001 |
| C6E | mf | .001 |
| C7E | mf | .001 |
| C8E | mf | .001 |
| C9E | mf | .001 |
| C10E | mf | .001 |
| C11E | mf | .001 |
| C12E | mf | .001 |
| C13E | mf | .001 |
| C14E | mf | .001 |
| C15E | mf | .001 |
| C16E | mf | .001 |
| C17E | mf | .001 |
| C18E | mf | .001 |
| C19E | mf | .001 |
| C20E | mf | .001 |
| C21E | mf | .001 |
| C22E | mf | .001 |
| C23E | mf | .001 |
| C24E | mf | .001 |
| C25E | mf | .001 |
| C28E | mmf | 100 |
| C29E | mf | .001 |
| C30E | mmf | 100 |
| C31E | mmf | 100 |
| C32E | mf | .001 |
| C33E | mf | .001 |
| C34E | mmf | 100 |
| C35E | mf | .001 |
| C36E | mf | .001 |
| C37E | mf | .001 |
| C38E | mf | .001 |
| C39E | mf | .001 |
| C40E | mf | .001 |
| L1E | mh | 3 |
| L2E | mc | 63.1 |
| L3E | mh | 3 |
| L4E | mc | 58.2 |
| L5E | mh | 3 |
| L6E | mc | 61.8 |
| L7E | mh | 3 |
| L8E | mc | 57 |
| L9E | mh | 3 |
| L10E | mh | 3 |
| L11E | mh | 3 |
| L12E | mh | 3 |
| L13E | mc | 61.9 |
| L14E | mc | 58.1 |
| L15E | μ | 3.3 |
| L16E | mh | 3 |
| L17E | mh | 3 |
| L18E | mc | 60 |
| L19E | mh | 3 |
| R1E | ohms | 51 |
| R2E | do | 12K |
| R3E | do | 43 |
| R4E | do | 1.8K |
| R5E | do | 9.1K |
| R6E | do | 470 |
| R7E | do | 2.7K |
| R8E | do | 470 |
| R9E | do | 43 |
| R10E | do | 1.8K |
| R11E | do | 3.3K |
| R12E | do | 470 |
| R13E | do | 43 |
| R14E | do | 1.8K |
| R15E | do | 9.1K |
| R16E | do | 470 |
| R17E | do | 43 |
| R18E | do | 1.8K |
| R19E | do | 2.2K |
| R20E | do | 470 |
| R21E | do | 200 |
| R22E | do | 47K |
| R23E | do | 470 |

Table V—Continued

| Part: | | Value |
|---|---|---|
| R24E | ohms | 180 |
| R25E | do | 10K |
| R26E | do | 10K |
| R27E | do | 220K |
| R28E | do | 1.5K |
| R29E | do | 91K |
| R30E | do | 10K |
| R31E | do | 100K |
| R32E | do | 10K |
| R33E | do | 47K |
| T1E | | ---- |
| T2E | | ---- |

| Tube: | Type |
|---|---|
| V1E | 5702 |
| V2E | 5702 |
| V3E | 5702 |
| V4E | 5702 |
| V5E | 5702 |
| V6E | 5718 |
| V7E | 5829 |
| V8E | 6BF7 |

Table VI, FIG. 3F—General notes (1) Choppers and phase inverters are duplicated for use in other plane of control.

| Part: | | Value |
|---|---|---|
| C1F | mf | 0.1 |
| C2F | mmf | 4.30 |
| C3F | mmf | 10 |
| C4F | mmf | 20 |
| C5F | mmf | 20 |
| C6F | mf | .01 |
| C7F | mf | .001 |
| C8F | mf | 0.1 |
| C9F | mf | 4.30 |
| C10F | mmf | 10 |
| C11F | mmf | 20 |
| C12F | mmf | 20 |
| C13F | mf | .01 |
| C14F | mf | .001 |
| C15F | mf | .01 |
| C16F | mf | .001 |
| C17F | mf | .001 |
| C18F | mf | .001 |
| C19F | mmf | 500 |
| C20F | mf | 0.001 |
| C21F | mf | 20 |
| C22F | mf | 0.005 |
| C23F | mmf | 100 |
| C24F | mmf | 300 |
| C30F | mf | 0.1 |
| C31F | mf | 0.01 |
| C32F | mmf | 100 |
| C33F | mf | 0.004 |
| C34F | mf | 0.001 |
| C35F | mf | 0.01 |
| C36F | mmf | 500 |
| C37F | mmf | 500 |
| C38F | mmf | 500 |
| C39F | mmf | 300 |
| C40F | mmf | 100 |
| L1F | mh | 1.5 |
| L2F | mh | 10 |
| L3F | | F178TT |
| R1F | ohms | 2K |
| R2F | do | 2K |
| R3F | do | 13K |
| R4F | do | 13K |
| R5F | do | 10K |
| R6F | do | 1K |
| R7F | do | 2K |
| R8F | do | 1K |
| R9F | ohms | 1K |
| R10F | do | 500K |
| R11F | do | 2K |
| R12F | do | 2K |
| R13F | do | 13K |
| R14F | do | 13K |
| R15F | do | 10K |
| R16F | do | 1K |
| R17F | do | 2K |
| R18F | do | 1K |
| R19F | do | 1K |
| R20F | do | 500K |
| R21F | do | 5.1K |
| R22F | do | 2K |
| R23F | do | 24K |
| R24F | 1 w | 13K |
| R25F | ohms | 1K |
| R26F | do | 5100K |
| R27F | do | 2K |
| R28F | do | 50K |
| R29F | do | 10K |
| R30F | do | 500K |
| R31F | megohm | 1 |
| R32F | do | 1 |
| R33F | ohms | 15K |
| R34F | do | 24K |
| R35F | do | 24K |
| R36F | do | 100K |
| R37F | do | 100K |
| R38F | do | 50K |
| R39F | do | 47K |
| R40F | megohm | 1 |
| R41F | ohms | 300K |
| R42F | do | 120K |

| Tube: | Type |
|---|---|
| V1F | 5829 |
| V2F | 5829 |
| V3F | 6111 |
| V4F | 5840 |
| V5F | 6111 |
| V6F | 6111 |
| V7F | 5829 |

| Part: | | Value |
|---|---|---|
| T1F | Newton | 1:1:1 |

Table VII, FIG. 3G—General notes (1) Current required +150 v.—52 ma., —150 v.—12 ma.
(2) Cup core—L2G, L3G.
(3) Glass—C1G, C10G, C22G, C23G, C24G, C25G.

| Part: | | Value |
|---|---|---|
| C1G | mf | .012 |
| C2G | mf | 0.05 |
| C3G | mf | .005 |
| C4G | mf | .01 |
| C5G | mf | 0.1 |
| C6G | mf | .002 |
| C7G | mf | 0.1 |
| C8G | mf | .01 |
| C9G | mmf | 80 |
| C10G | mf | .001 |
| C11G | mf | .001 |
| C12G | mmf | 100 |
| C13G | mmf | 10 |
| C14G | mf | .001 |
| C15G | mmf | 10 |
| C16G | mf | .02 |
| C17G | mf | .002 |
| C18G | mf | .002 |
| C19G | mf | .5 |
| C20G | mf | .001 |
| C21G | mmf | 100 |
| C22G | mmf | 80 |

Table VII—Continued

| Part: | | Value |
|---|---|---|
| C23G | mf | .001 |
| C24G | mf | .001 |
| C25G | mmf | 400 |
| C26G | mf | .01 |
| L1G | F1711T, h | 0.5 |
| L2G | mh | 1.3 to 2.0 |
| L3G | mh | 1.3 to 2.0 |
| P1G | ohms | 100K |
| R2G | megohms | 2 |
| R3G | ohms | 87 |
| R4G | do | 180K |
| R5G | megohm | 1 |
| R6G | ohms | 10K |
| R7G | do | 180K |
| R8G | do | 330K |
| R9G | do | 3.9K |
| R10G | megohm | 1 |
| R11G | ohms | 100K |
| R12G | do | 1.8K |
| R13G | do | 270K |
| R14G | do | 39K |
| R15G | megohm | 1 |
| R16G | ohms | 1.2K |
| R17G | do | 15K |
| R18G | do | 51K |
| R19G | do | 3.9K |
| R20G | do | 3.9K |
| R21G | do | 56K |
| R22G | do | 100K |
| R23G | do | 20K |
| R24G | do | 100K |
| R25G | do | 330 |
| R26G | do | 3.9K |
| R27G | do | 100K |
| R28G | megohm | 1.6 |
| R29G | ohms | 100K |
| R30G | do | 100K |
| R31G | megohm | 1 |
| R32G | do | 1 |
| R33G | ohms | 330K |
| R34G | do | 330K |
| R35G | do | 560K |
| R36G | do | 100K |
| R37G | do | 330 |
| R38G | do | 3.6K |
| R39G | do | 100K |
| R40G | do | 20K |
| R41G | do | 43K |
| R42G | do | 1.8K |
| R43G | do | 820 |
| R44G | do | 1.2K |
| R45G | do | 20K |

| Tube: | Type |
|---|---|
| V1G | 6112 |
| V2G | 6111 |
| V3G | 6110 |
| V4G | 6111 |
| V5G | 6111 |
| V6G | 6111 |
| V7G | 6111 |
| T1G | ---- |

Table VIII, FIG. 3H—General notes

Tune at 2000 c.p.s. with silver mica condenser.

| Part: | | Value |
|---|---|---|
| C1H | mmf | 500 |
| C2H | mmf | 500 |
| C3H | mf | 0.005 |
| C4H | mmf | 500 |
| C5H | mf | 0.005 |
| C6H | mf | 0.1 |
| C7H | mmf | 500 |
| C8H | mf | 0.001 |
| C9H | mf | 0.01 |
| C10H | mf | 0.02 |
| C11H | mf | .0136 |
| C12H | mf | 0.005 |
| C13H | mf | 0.05 |
| C14H | mf | 0.5 |
| C15H | mf | 0.02 |
| C16H | mf | 0.02 |
| C17H | mf | 0.0129 |
| C18H | mf | 0.01 |
| C19H | mf | 0.01 |
| C20H | mmf | 2800 |
| C21H | mmf | 30 to 300 |
| C22H | mf | 0.005 |
| C23H | mf | 0.05 |
| C24H | mf | 0.25 |
| C25H | mf | 0.25 |
| C26H | mf | .005 |
| L1H | mh | 500 |
| L2H | mh | 500 |
| L3H | h | 2 |
| R1H | ohms | 220K |
| R2H | do | 220K |
| R3H | megohm | 1 |
| R4H | ohms | 4.3 |
| R5H | | ------ |
| R6H | do | 10K |
| R7H | do | 1K |
| R8H | megohm | 1 |
| R9H | ohms | 220K |
| R10H | do | 820K |
| R11H | do | 100K |
| R12H | do | 82K |
| R13H | do | 2000 |
| R14H | do | 220K |
| R15H | do | 200K |
| R16H | do | 3900 |
| R17H | do | 3900 |
| R18H | do | 47K |
| R19H | do | 270K |
| R20H | megohm | 1 |
| R21H | ohms | 1200 |
| R22H | do | 200K |
| R23H | megohm | 1 |
| R24H | ohms | 100K |
| R25H | do | 100K |
| R26H | do | 220K |
| R27H | | ------ |
| R28H | do | 220K |
| R29H | | ------ |
| R30H | | ------ |
| R31H | do | 200K |
| R32H | do | 220K |
| R33H | do | 2000 |
| R34H | do | 2400 |
| R35H | do | 220K |
| R36H | | ------ |
| R37H | do | 1000 |
| R38H | do | 20K |
| R39H | do | 100K |
| R40H | do | 100K |
| R41H | do | 330K |
| R42H | do | 330K |
| R43H | do | 680K |
| R44H | do | 500K |
| R45H | do | 220K |
| T1H | | ------ |
| T2H | | ------ |
| T3H | | ------ |

| Tube: | Type |
|---|---|
| V1H | 5829 |

Table VII—Continued

| Tube: | Type |
|---|---|
| V2H | 6111 |
| V3H | 6111 |
| V4H | 5829 |
| V5H | 5702 |
| V6H | 6111 |
| V7H | 6111 |
| V8H | 5829 |

Table IX, FIG. 3K—General notes (1) All resistors ½ w. unless otherwise specified.
(2) Condensers must test at least 1000 megohms.

| Part: | | Value |
|---|---|---|
| C3K | mf | .25 |
| C4K | mf | .05 |
| C6K | mf | .02 |
| C7K | mf | .001 |
| C8K | mf | .005 |
| C11K | mf | 1.0 |
| C12K | mf | 1.0 |
| C80K | mf | 1.0 |
| C81K | mf | .5 |
| R3K | 1 w. | 22K |
| R4K | ohms | 2.7K |
| R5K | megohm | 1 |
| R6K | do | 3.9 |
| R7K | do | 2 |
| R8K | do | 10 |
| R9K | ohms | 39K |
| R10K | do | 1.2K |
| R11K | do | 100K |
| R12K | do | 24K |
| R13K | do | 5.1K |
| R14K | megohm | 1 |
| R15K | ohms | 120K |
| R16K | megohms | 5 |
| R17K | do | 5 |
| R18K | megohm | 1 |
| R19K | ohms | 10K |
| R20K | do | 100K |
| R21K | do | 100K |
| R22K | megohms | 3 |
| R23K | ohms | 200K |
| R24K | do | 8200 |
| R25K | megohms | 5.1 |
| R26K | do | 1.5 |
| R28K | do | 3 |
| R29K | ohms | 100K |
| R30K | do | 200K |
| R31K | do | 8200 |
| R32K | megohm | 1 |
| R33K | ohms | 680K |
| R34K | do | 18K |
| R36K | do | 12K |
| R37K | do | 20K |
| R38K | do | 39K |
| R39K | megohm | 1 |
| R41K | do | 1.5 |
| R42K | ohms | 120K |
| R43K | do | 27K |
| R44K | do | 500K |
| R45K | do | 100K |
| R46K | do | 2200 |
| R47K | megohms | 18 |
| R48K | megohm | 1 |
| R49K | ohms | 82K |
| R50K | do | 300K |
| R51K | do | 20K |
| R52K | do | 100K |
| R53K | megohms | 1.8 |
| R54K | ohms | 20K |
| R55K | do | 6200 |
| R56K | do | 9100 |
| R57K | ohms | 910 |
| R80K | megohm | 1 |
| R800K | do | 12 |
| P1K | ohms | 100K |
| P2K | megohm | 1 |
| P3K | ohms | 250K |

| Tube: | Type |
|---|---|
| V2K | 5840 |
| V3K | 6111 |
| V4K | 6112 |
| V5K | 6112 |
| V6K | 6110 |
| V7K | 6111 |
| V8K | 6111 |
| V11K | 6111 |

What is claimed is:

1. In a CW homing system for receiving reflected signals from targets, comprising two Doppler gate amplifier units for selecting the desired target signal among all Doppler-shifted signals and for providing a tunable narrow pass-band to improve signal to noise ratio, a variable local oscillator unit connected to each of said Doppler gate amplifier units for supplying a varying frequency signal for heterodyning in said Doppler gate units, a phase locked frequency loop having circuitry connected between one of said Doppler gate amplifier units and said variable local oscillator unit for varying the frequency of the signal from said variable local oscillator unit whereby a selected Doppler target signal to said Doppler gate amplifier units is tracked by said variable local oscillator unit to maintain the selected Doppler target signal within the pass-band of the Doppler gate amplifier units.

2. In a CW homing system having two receiving channels for receiving reflected target signals, wherein the reflected target signals in each channel are converted into two Doppler frequency signals respectively, said Doppler frequency signals having a Doppler frequency difference correlative to the rate of change of the lead angle of the target from the missile, Doppler gate means for each channel for receiving said Doppler frequency signals respectively, variable local oscillator means connected to each of said Doppler gate means for supplying the same signal to said Doppler gate means to heterodyne with the Doppler frequency signal thereby establishing a Doppler gate signal, said variable local oscillator means maintaining the Doppler gate signal in one of said Doppler gate means and maintaining the Doppler gate signal plus the Doppler frequency difference between the Doppler frequency signals in the other of said Doppler gate means, an electronic search unit means connected to one of said Doppler gate means and said variable local oscillator means, said search unit means analyzing the outputs of said Doppler gate means for providing a sweep signal to said variable local oscillator means, said sweep signal being applied to said variable local oscillator means for changing the frequency of said variable local oscillator signal whereby said variable local oscillator means sweep the Doppler frequency band of the Doppler frequency signals received by said Doppler gate means.

3. A search unit for an interferometric homing system comprising a phase detector for indicating a negative DC voltage in the presence of a Doppler frequency difference upon the reception of Doppler target signals within the system and random noise voltage with no DC component in the absence of a Doppler frequency difference, a rectifier electrically connected to said phase detector for rectifying the positive cycle of said noise voltage, an integrator electrically connected to said rectifier for receiving and integrating the positive rectified output of said rectifier, said integrator having feedback circuitry continuously supplying an integrated output to an electronic tuning means in said system for varying the frequency of a local oscillator to cause sweeping signals for sweeping the desired band of Doppler target signals.

4. A search unit for an interferometric homing system comprising a phase detector for indicating a negative DC voltage in the presence of a Doppler frequency difference on the reception of Doppler target signals within the system and random noise voltages having no DC component in the absence of a Doppler frequency difference, a rectifier electrically connected to said phase detector for rectifying the positive cycle of said noise voltage, an integrator electrically connected to said rectifier for receiving and integrating the positive rectified output of said rectifier, a local oscillator in said system, said integrator supplying an integrated output voltage for varying the frequency of said local oscillator to cause sweeping of the band of Doppler target signals, and circuitry means connected between said phase detector and said rectifier for applying a DC negative voltage from said phase detector to said rectifier to cut off said rectifier thereby providing no positive rectified output thus preventing said integrator from momentarily advancing said sweep of the local oscillator.

5. The search unit of claim 3 including flip-flop means electrically connected to said phase detector for inactivating after a predetermined delay said rectifier from said integrator upon the indication of a negative DC voltage from said phase detector whereby the sweeping voltage causing variation of said local oscillator is stopped in the presence of a Doppler frequency difference at said phase detector.

6. A search unit for an interferometric homing system comprising a phase detector for indicating a negative DC voltage in the presence of a Doppler frequency difference upon the reception of Doppler target signals within the system and random noise voltage with no DC component in the absence of a Doppler frequency difference, a rectifier electrically connected to said phase detector for rectifying the positive part of said noise voltage, an integrator for receiving and integrating the positive rectified output of said rectifier, a local oscillator in said system, said integrator supplying an integrated output voltage for varying the frequency of said local oscillator to cause sweeping of the band of Doppler target signals, and flip-flop means for electrically connecting said rectifier to said integrator after a negative DC voltage is not received in a predetermined time and for furnishing said integrator with a short negative pulse whereby said frequency of the local oscillator is shifted to a lower frequency before the oscillator continues to sweep the band of Doppler target signals.

7. An interferometric homing seeker for a guided missile of the semiactive type designed for operation in the X-band frequency in an air to air missile, wherein a parent aircraft carries a CW transmitter for illumination of targets, said seeker being of the phase-rate type and comprising a reflected signal receiving apparatus, said receiving apparatus having four measurement channels, two of said channels being responsive in each plane of a two plane system, said channels each including antenna means for receiving a reflected signal from said targets, mixer means having an output and being coupled to said channel receiving means for heterodyning said reflected signal to an intermediate frequency signal, reference signal means for giving a signal representative of said CW transmitter, Doppler converting means energized from said mixer output and said reference signal means for converting the said intermediate frequency signal to target Doppler signals, Doppler gating means coupled to said Doppler converting means for selecting a desired Doppler target signal representative of relative motion between the said selected Doppler target signal and the missile, a measurement means energized from said Doppler gating means in said channels for processing said selected Doppler target signal to a control signal, and means coupled to said measuring means responsive to said control signal for guiding the guided missile along a collision course with the target.

8. A phase-comparison type seeker apparatus for a missile operating on the interferometric principle of seeking targets comprising first and second channel receiving means for receiving reflected energy from targets, a Doppler gate amplifier in each of said channel receiving means for selecting a desired target signal from the reflected energy from said targets, a reference signal means electrically coupled with one of said gate amplifiers for providing an injected phase rate signal proportional to missile angular velocity, measurement unit energized from said Doppler gate amplifiers for comparing the output of each of said Doppler gate amplifiers to measure the differential phase rate in combination with the said injected phase-rate signal in accordance with the formula $$\phi = 2\pi \Delta f = \frac{2\pi d}{\lambda} \beta \cos \beta$$

where $\beta$ is the lead angle measured in a plane containing an antenna pair and the line of sight to the target and $d/\lambda$ is the antenna wavelength, and a search unit means electrically coupled for receiving signal voltages from said measurement unit and having feedback circuitry to each of said Doppler gate amplifiers for providing a sweeping signal for sweeping said gating amplifiers over a selected band of frequencies where target signals may appear.

9. A seeker apparatus as set forth in claim 8 wherein said measurement unit includes a mixer means giving an output signal of the difference between said Doppler gate amplifiers in each of said channels whereby the output signal of mixer is representative of a fixed reference frequency plus the phase between channels minus the missile rate of turn reference, reference oscillator means electrically coupled to said mixer output and energized by said mixer output so as to be injection locked thereby producing a constant amplitude signal, a frequency discriminator means electrically coupled to said reference oscillator for further processing said constant amplitude signal to a polarity responsive DC signal, and means responsive to said DC signal for actuating the control surfaces of a missile.

10. A seeker apparatus set forth in claim 9 wherein said search unit means includes a phase detector electrically coupled to two input circuits from said measurement unit, one of said input circuits being energized from said mixer means in said measurement unit for producing a locking signal and the other of said input circuits being energized from said reference oscillator means in said measuring unit for producing a locked oscillator signal, said phase detector measuring the phase difference between said locking signal and said locked oscillator signal whereby said locking signal and said locking oscillator signal are in phase in the presence of a target signal thereby providing a large negative DC voltage at said phase detector output, an integrator means electrically coupled to said phase detector output for serving as a memory device responsive upon DC energization for keeping the position of the sweep approximately at the same position when a temporary fade-out of a target signal occurs, said feedback circuitry being coupled from said integrator for feeding signals to said gating amplifiers to thereby keep the sweep at its approximate position before target fading, and a delayed flip-flop unit having an input and outputs, said flip-flop unit being electrically coupled to said integrator means and said phase detector means for starting sweeping signals by said integrator for feeding signals to said gating amplifiers when a target signal is lost for a predetermined period.

11. In a missile-target collision course system for a semi-active X-band homing missile system wherein a parent aircraft carries a continuous wave transmitter for transmitting a continuous wave illumination signal for illuminating a target and the air-to-air missile carries a homing phase rate seeker for homing on reflected target signals on first and second reference planes wherein the said first reference plane homing means comprises a first and second measurement channel means for receiving reflected signals from targets, a reference means coupled to each of said first and said second channel means for providing a reference signal representative of said continuous wave illumination signal, a first Doppler gating means in said first channel and a second Doppler gating means in said second channel for selecting a desired target signal from among all of said reflected target signals, a variable local oscillator unit electrically coupled to said first and said second Doppler gating means for providing sweeping signals over a desired target frequency range, a fixed local oscillator electrically coupled to said first Doppler gating means and said second Doppler gating means for providing first and second fixed reference heterodyning signals for the respective Doppler gate signals, a measurement unit electrically coupled to said first Doppler gating means and said second Doppler gating means and energized by the respective outputs of said gating means for providing command signals in accordance with the desired target signal from each of said measurement channel means and a search unit electrically coupled to said measurement unit for providing control signals for blocking and unblocking output command signals from said measurement unit in accordance with the presence and absence of said desired target signal.

12. An apparatus for providing command signals to a missile following a collision course with a target comprising first means for providing an injected phase rate signal proportional to missile angular velocity, second means for providing a Doppler frequency signal difference measuring means electrically coupled to said first means and said second means for measuring the Doppler frequency signal difference with the injected phase-rate signal to provide a measured output signal, and a means coupled to said measuring means to generate command signals for missile guidance in accordance with said measured output signal.

13. In a system for establishing a collision course of a missile relative to a moving target, said system comprising a first channel for receiving signals from said target, a second channel for receiving signals from said target, a variable local oscillator having an input and outputs and being electrically coupled to each of said first and said second channels for providing a sweep signal for sweeping over frequency ranges where targets may appear, an automatic frequency control loop electrically coupling one of said variable local oscillator outputs to the input of said local oscillator and comprising a first mixer unit having first and second inputs and an output whereby said target signal of said first channel energizes said first input and said local oscillator energizes said second input thereby providing a signal at the output of said mixer unit representative of the combined signals, a first amplifier having signal output means, said first amplifier being electrically coupled to said output of the said first mixer unit for increasing the gain of the combined signals, a second mixer unit having first and second inputs and an output whereby said output signal from said first amplifier energizes the first input and a fixed oscillator unit provides a signal to energize the second input thereby providing a signal representative of the combined signal, a second amplifier having a signal output, said second amplifier being electrically coupled to said output of said second mixer unit for increasing the gain of the combined signals, circuitry means coupled between the output of said second amplifier and the input of said variable local oscillator unit for providing a control signal for sweeping said variable oscillator over frequency ranges where targets may be detected.

References Cited
UNITED STATES PATENTS 2,663,518   12/1953   Muffly _____ 244—14.2

VERLIN R. PENDEGRASS, Primary Examiner